US012579603B2

(12) United States Patent
Lim et al.

(10) Patent No.: US 12,579,603 B2
(45) Date of Patent: Mar. 17, 2026

(54) IMAGE PROJECTION DEVICE AND METHOD FOR OPERATING THE SAME

(71) Applicant: Samsung Electronics Co., Ltd., Suwon-si (KR)

(72) Inventors: Hyungjun Lim, Suwon-si (KR); Hyunku Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/810,184

(22) Filed: Aug. 20, 2024

(65) Prior Publication Data

US 2025/0193336 A1 Jun. 12, 2025

Related U.S. Application Data

(63) Continuation of application No. PCT/KR2024/011897, filed on Aug. 9, 2024.

(30) Foreign Application Priority Data

Dec. 12, 2023 (KR) ........................ 10-2023-0179283

(51) Int. Cl.
*G06T 3/08* (2024.01)
*G06T 3/10* (2024.01)
(Continued)

(52) U.S. Cl.
CPC .................. *G06T 3/08* (2024.01); *G06T 3/10* (2024.01); *H04N 5/74* (2013.01); *H04N 9/3185* (2013.01)

(58) Field of Classification Search
CPC ... G06T 3/08; G06T 3/10; H04N 5/74; H04N 9/3185
See application file for complete search history.

(56) References Cited

U.S. PATENT DOCUMENTS 8,355,601 B2 1/2013 Ding et al.
8,941,785 B2 1/2015 Saigo
(Continued)

FOREIGN PATENT DOCUMENTS

JP 2000-314923 11/2000
JP 2005-043570 2/2005
(Continued)

OTHER PUBLICATIONS

Search Report and Written Opinion dated Nov. 5, 2024 in International Application No. PCT/KR2024/011897 and English-langauge translation.

*Primary Examiner* — John R Schnurr
(74) *Attorney, Agent, or Firm* — NIXON & VANDERHYE P.C.

(57) ABSTRACT

The disclosure relates to an image projection device and method that corrects an image to be projected onto multiple surfaces forming a defined angle considering a viewing position. The image projection device may output an image to be projected onto a projection area including an image display area where an image is to be substantially displayed in a projection surface including at least two surfaces bent at a defined angle with respect to a corner. The image projection device may receive a control signal for changing a view point of viewing the projection area from a remote control device and update pixel values of the image to be projected, corresponding to projection points of the projection area in response to the control signal.

16 Claims, 15 Drawing Sheets

(51) Int. Cl.
    *H04N 5/74*          (2006.01)
    *H04N 9/31*          (2006.01)

(56)           References Cited

U.S. PATENT DOCUMENTS

| | | | | |
|---|---|---|---|---|
| 9,167,218 | B2 | 10/2015 | Saigo | |
| 9,596,441 | B2 * | 3/2017 | Shin | H04N 9/3185 |
| 10,284,831 | B2 * | 5/2019 | Tanaka | G09G 5/36 |
| 10,976,812 | B2 * | 4/2021 | Ikeda | G09G 5/00 |
| 11,323,674 | B2 * | 5/2022 | Hsiao | H04N 9/3185 |
| 11,512,945 | B2 * | 11/2022 | Shishido | H04N 9/3185 |
| 11,676,241 | B2 * | 6/2023 | Yamauchi | G06T 3/06 |
| | | | | 345/585 |
| 2010/0321408 | A1 | 12/2010 | Miceli et al. | |
| 2014/0016041 | A1 | 1/2014 | Kim et al. | |
| 2015/0102995 | A1 * | 4/2015 | Shen | G09G 5/00 |
| | | | | 345/156 |
| 2015/0195479 | A1 * | 7/2015 | Sano | G03B 21/147 |
| | | | | 348/745 |
| 2015/0254819 | A1 * | 9/2015 | Hara | G06T 5/80 |
| | | | | 345/647 |
| 2017/0374332 | A1 * | 12/2017 | Yamaguchi | G06V 40/166 |
| 2018/0007329 | A1 * | 1/2018 | Tanaka | G01B 11/2513 |
| 2019/0004599 | A1 * | 1/2019 | Ikeda | G09G 5/00 |
| 2019/0289205 | A1 * | 9/2019 | Lin | H04N 23/698 |
| 2020/0045277 | A1 * | 2/2020 | Hsiao | H04N 9/3185 |
| 2021/0241419 | A1 * | 8/2021 | Yamauchi | H04N 9/3194 |
| 2021/0350501 | A1 * | 11/2021 | Yamauchi | H04N 9/3194 |
| 2022/0030206 | A1 | 1/2022 | Ikeda et al. | |
| 2022/0141435 | A1 | 5/2022 | Zhang et al. | |
| 2022/0196836 | A1 | 6/2022 | Zhong et al. | |
| 2022/0276770 | A1 | 9/2022 | Davis et al. | |
| 2025/0124538 | A1 * | 4/2025 | Lee | G03B 17/54 |

FOREIGN PATENT DOCUMENTS

| | | |
|---|---|---|
| JP | 2011-002826 | 1/2011 |
| JP | 2011147125 A | 7/2011 |
| JP | 2014192688 A | 10/2014 |
| JP | 2022-147145 | 10/2022 |
| JP | 2022146113 A | 10/2022 |
| KR | 10-2014-0010851 | 1/2014 |
| KR | 10-2015-0080678 | 7/2015 |

* cited by examiner

30

| TRANSCEIVER | ~820 |
| PROCESSOR | ~810 |
| USER I/F | ~830 |

FIG.9

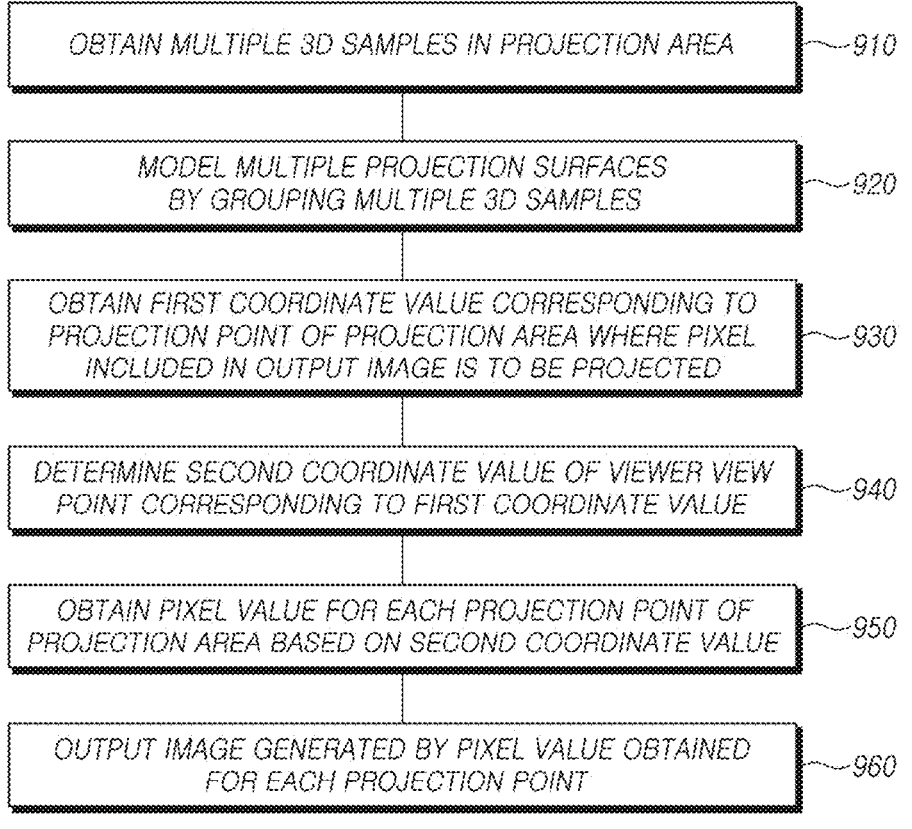

OBTAIN MULTIPLE 3D SAMPLES IN PROJECTION AREA ～910

MODEL MULTIPLE PROJECTION SURFACES
BY GROUPING MULTIPLE 3D SAMPLES ～920

OBTAIN FIRST COORDINATE VALUE CORRESPONDING TO
PROJECTION POINT OF PROJECTION AREA WHERE PIXEL
INCLUDED IN OUTPUT IMAGE IS TO BE PROJECTED ～930

DETERMINE SECOND COORDINATE VALUE OF VIEWER VIEW
POINT CORRESPONDING TO FIRST COORDINATE VALUE ～940

OBTAIN PIXEL VALUE FOR EACH PROJECTION POINT OF
PROJECTION AREA BASED ON SECOND COORDINATE VALUE ～950

OUTPUT IMAGE GENERATED BY PIXEL VALUE OBTAINED
FOR EACH PROJECTION POINT ～960

| | X | Y | Z |
|---|---|---|---|
| 1 | −0.98207 | −0.80404 | 1.903817 |
| 2 | −0.98871 | 0.178118 | 1.981639 |
| 3 | −0.98231 | 0.025504 | 1.969155 |
| 4 | −0.9793 | −0.13446 | 1.962827 |
| 5 | −0.97369 | −0.28382 | 1.950461 |
| 6 | −0.97128 | −0.44164 | 1.942336 |
| 7 | −0.98686 | 0.50448 | 1.99081 |
| 8 | −0.98562 | 0.341546 | 1.992401 |
| 9 | −0.96594 | −0.59345 | 1.94272 |
| 10 | −0.99193 | 0.667372 | 2.010928 |
| 11 | −0.96176 | −0.74719 | 1.936865 |
| 12 | −0.95459 | −0.05514 | 1.986318 |
| 13 | −0.96004 | 0.427415 | 2.014779 |
| 14 | −0.95876 | 0.272036 | 2.01369 |
| ... | ... | ... | ... |

OBTAIN DATA

FIG.11
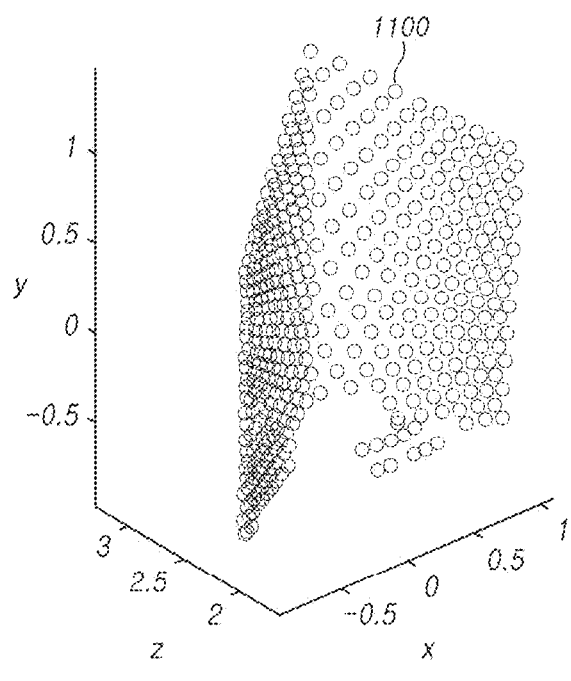
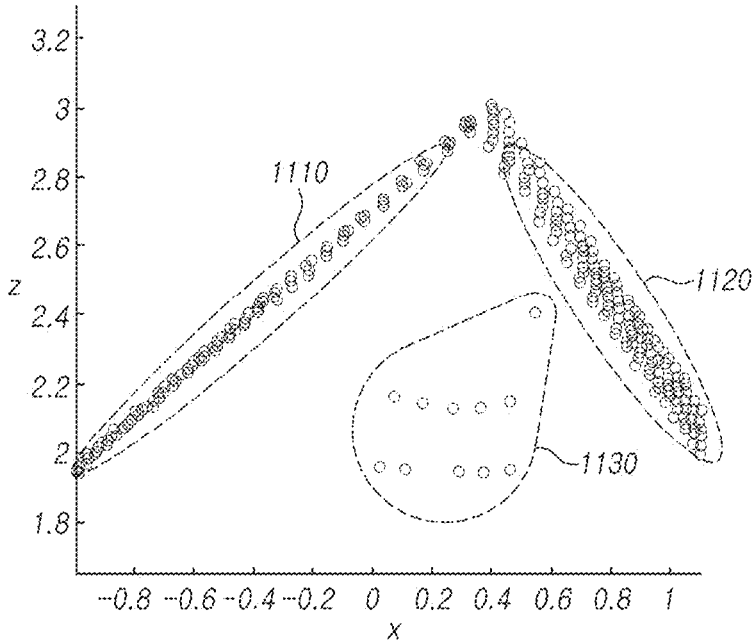

INPUT IMAGE

OUTPUT IMAGE (IMAGE TO BE PROJECTED)

IMAGE PROJECTION DEVICE AND METHOD FOR OPERATING THE SAME

CROSS-REFERENCE TO RELATED APPLICATIONS

This application is a continuation of International Application No. PCT/KR2024/011897 designating the United States, filed on Aug. 9, 2024, in the Korean Intellectual Property Receiving Office and claiming priority to Korean Patent Application No. 10-2023-0179283, filed on Dec. 12, 2023, in the Korean Intellectual Property Office, the disclosures of each of which are incorporated by reference herein in their entireties.

BACKGROUND

Field

The disclosure relates to an image projection device and method for displaying an image on a projection surface.

Description of Related Art

Projection devices may be divided into analog-type projection devices (hereinafter, 'analog projection devices') or digital-type projection devices (hereinafter, 'digital projection devices'). The analog projection device may be a projection device that provides visual information using a medium, such as a film. The digital projection device may be a projection device that provides visual information using digital signals. The digital projection device may include a beam projector (hereinafter referred to as "projector"). The projector may be classified as a display device. The projector may be implemented as a cathode ray tube (CRT) projector, a liquid crystal display (LCD) projector, or a digital light processing (DLP) projector depending on how to generate light.

The projector is used mainly to display input multimedia content as it is but, as wired/wireless communication networks develop, the projector may be connected to an electronic device, e.g., a digital TV, to assist the electronic device.

The projector may be an electronic device that may project images such as slides, photos on a transparent sheet, pictures or text on the screen through a lens. The projector is also called an image projection device. The projector may convert data about an image or video in the form of a file into an optical signal (or light image) and output it. The output of the optical signal may correspond to an irradiation. The optical signal output by the projector may be projected on the screen to provide an image to the viewer.

There are various proposed methods for projecting an image on a projection surface including multiple surfaces bent at a defined angle or various angles, as well as a flat surface, to expand the projection area of the projector. The projector corrects the image to be projected onto the multiple surfaces with respect to one view point and outputs the corrected image. In this case, however, distortion may occur in the projected image due to a change in view point.

SUMMARY

Embodiments of the disclosure may provide an image projection device and method that corrects an image to be projected onto multiple surfaces forming a defined angle considering a viewing position.

According to an example embodiment, an image projection device may comprise: a transceiver, at least one memory, an image projector, and at least one processor, comprising processing circuitry, operably connected to the transceiver, the at least one memory, and/or the image projector. At least one processor, individually and/or collectively, may be configured to: control the image projector to output an image to be projected onto a projection area including an image display area where an image is to be substantially displayed in a projection surface including at least two surfaces bent at a defined angle with respect to a corner; receive a control signal for changing a view point of viewing the projection area from a remote control device through the transceiver and update pixel values of the image to be projected, corresponding to projection points of the projection area in response to the control signal. The pixel values of the image to be projected may be updated so that an image to be displayed in the image display area is viewed as a rectangle at the view point.

According to an example embodiment, a method for operating an image projection device may comprise: outputting an image to be projected onto a projection area including an image display area where an image is to be substantially displayed on a projection surface including at least two surfaces bent at a defined angle with respect to a corner, receiving a control signal for changing a view point at which the projection area is viewed from a remote control device, and updating pixel values of the image to be projected corresponding to projection points of the projection area in response to the control signal. The pixel values of the image to be projected may be updated so that an image to be displayed in the image display area is viewed as a rectangle at the view point.

According to an example embodiment of the disclosure, the image projection device capable of projecting an image even onto a projection surface including multiple surfaces bent at a defined angle allows the user to selectively change the view point, providing convenience of easy viewing of the projection image fitting his or her view point.

The disclosure is not limited to the foregoing, and various changes or modifications may be made by one of ordinary skill in the art from example embodiments of the disclosure.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

3

Figure 4:
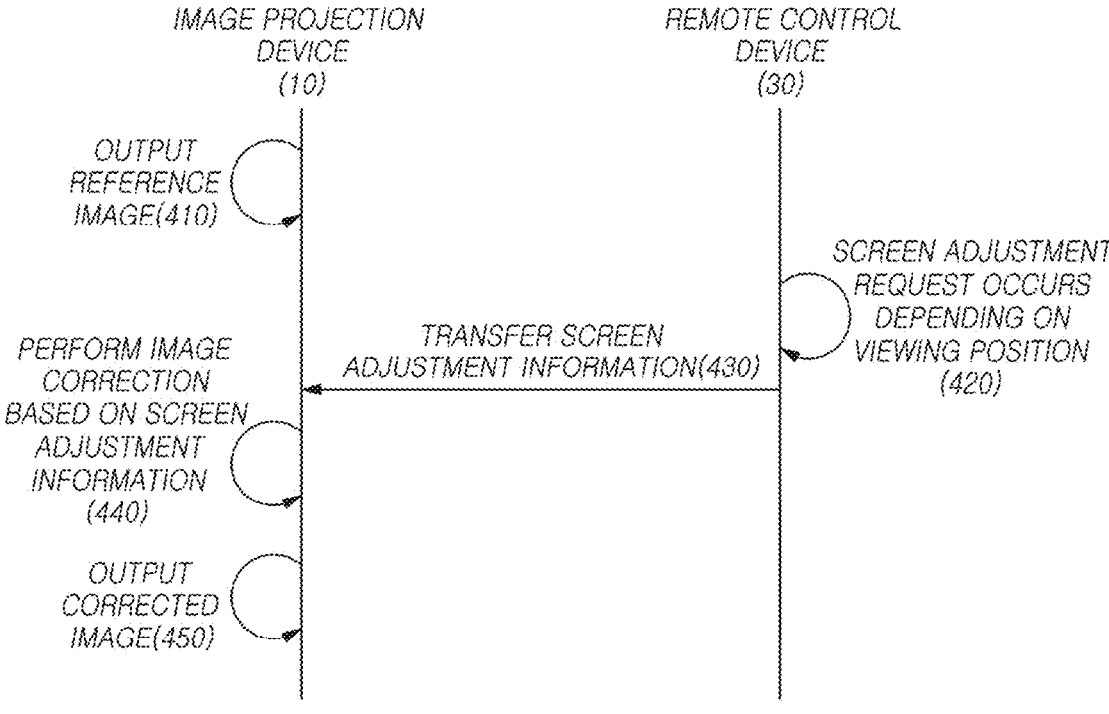
Figure 5:
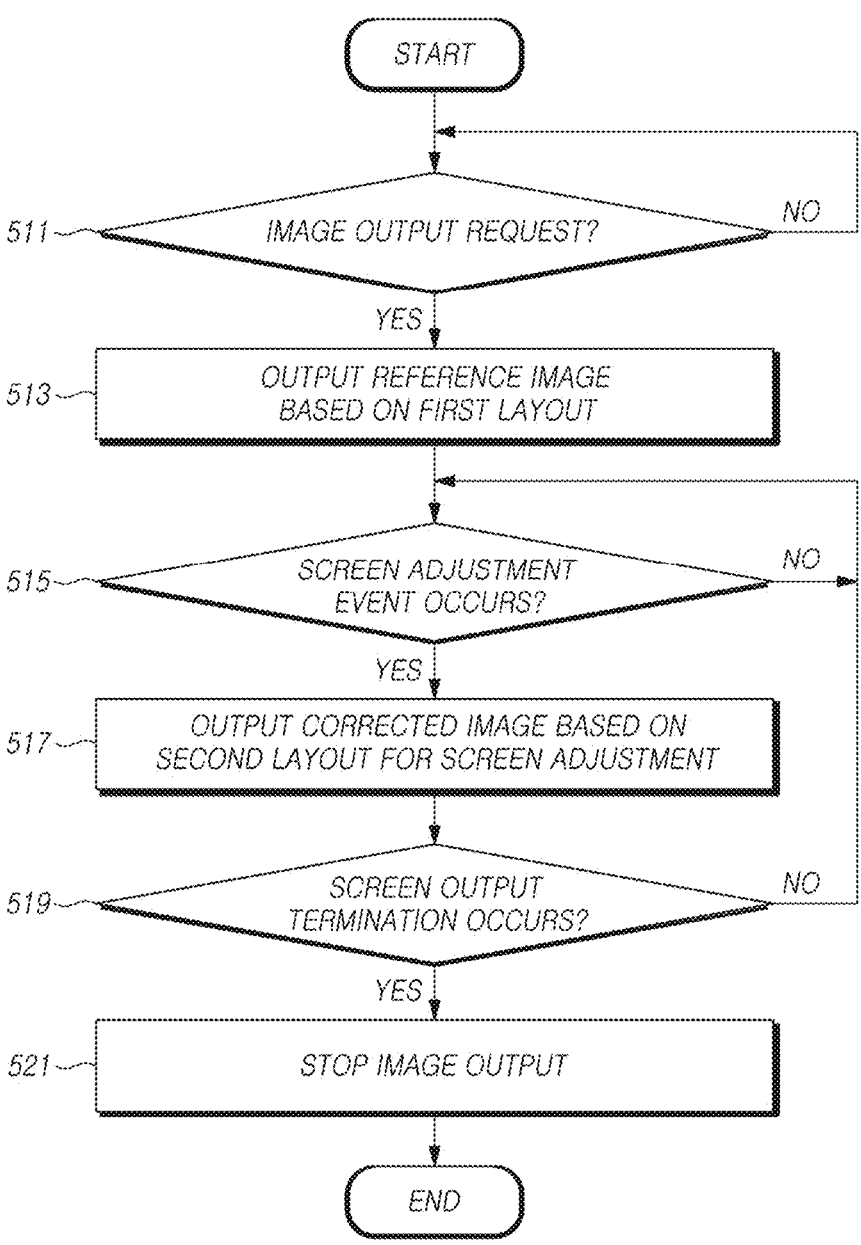
Figure 6:
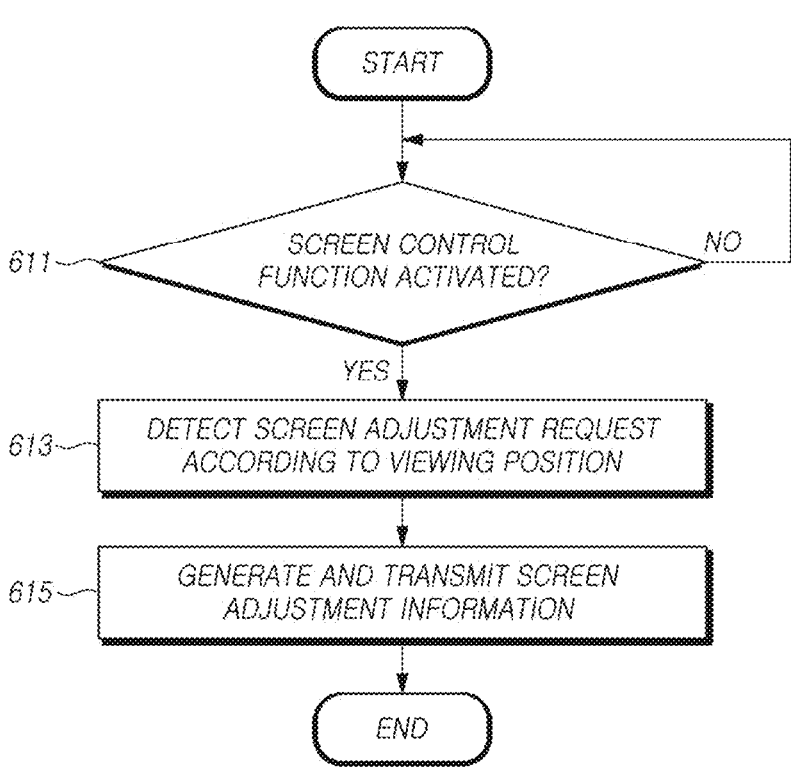
Figure 7:
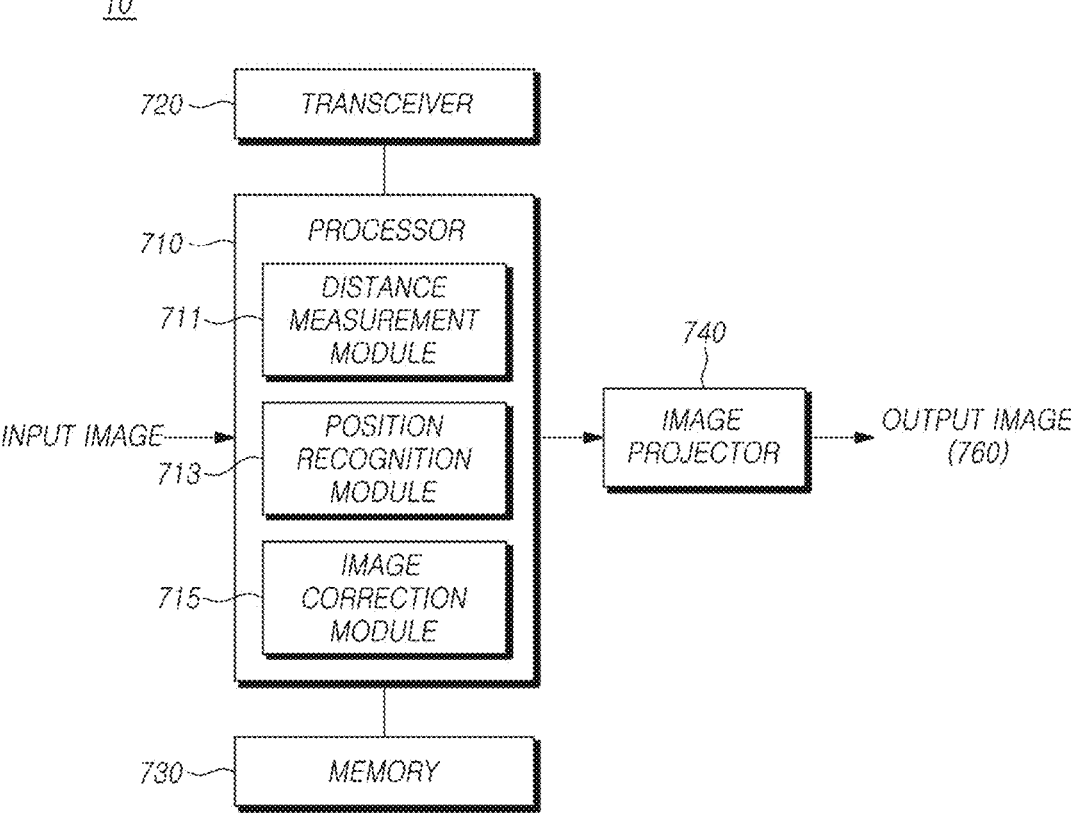
Figure 8:
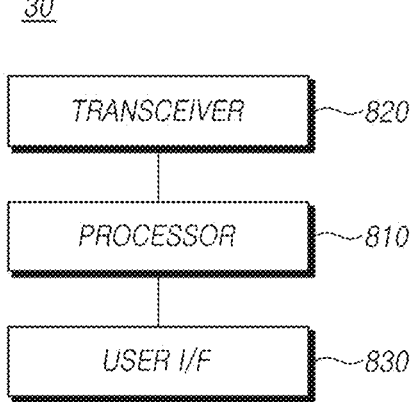
Figure 10:
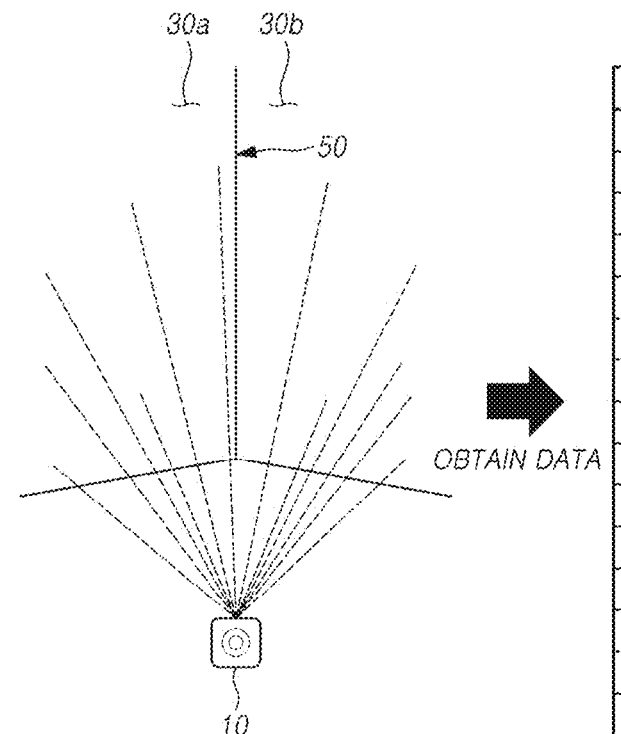
Figure 12:
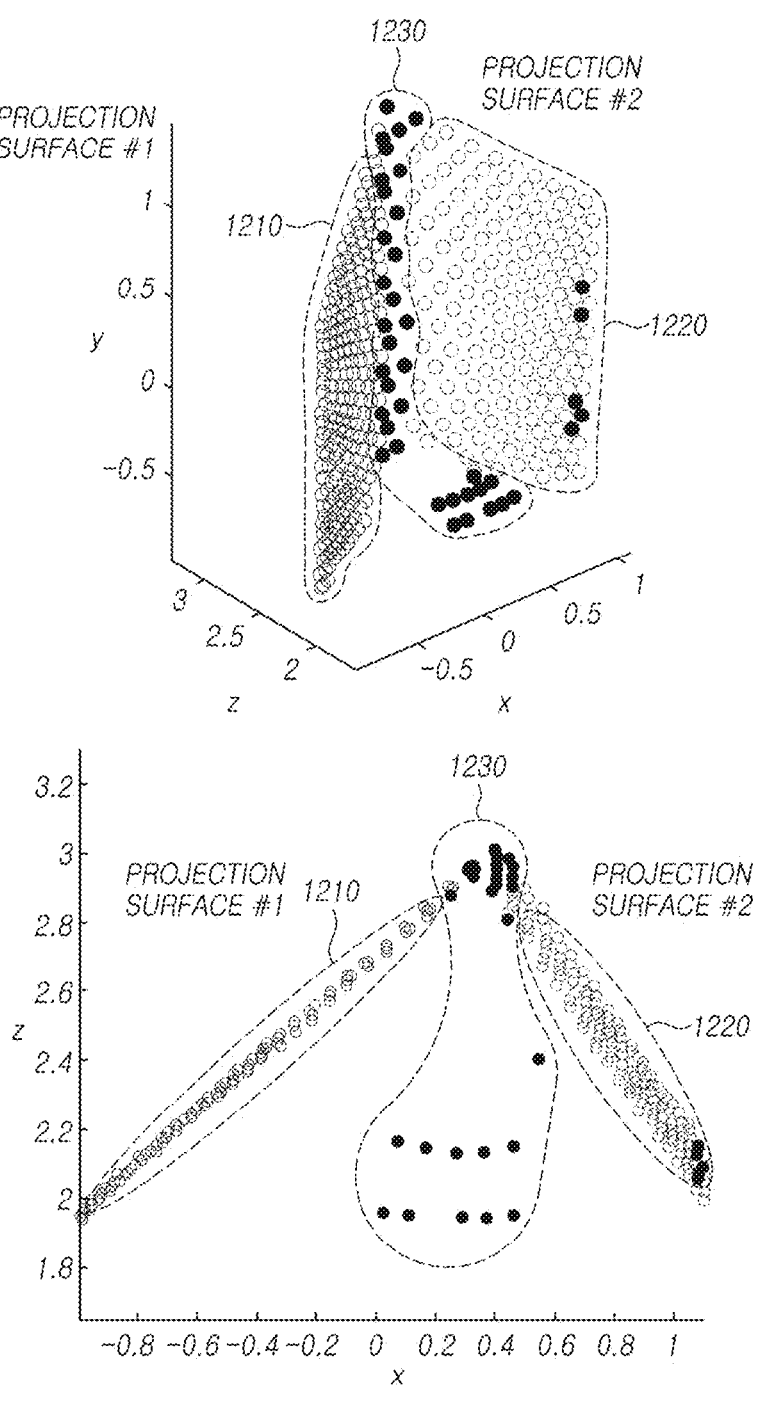
Figure 13:
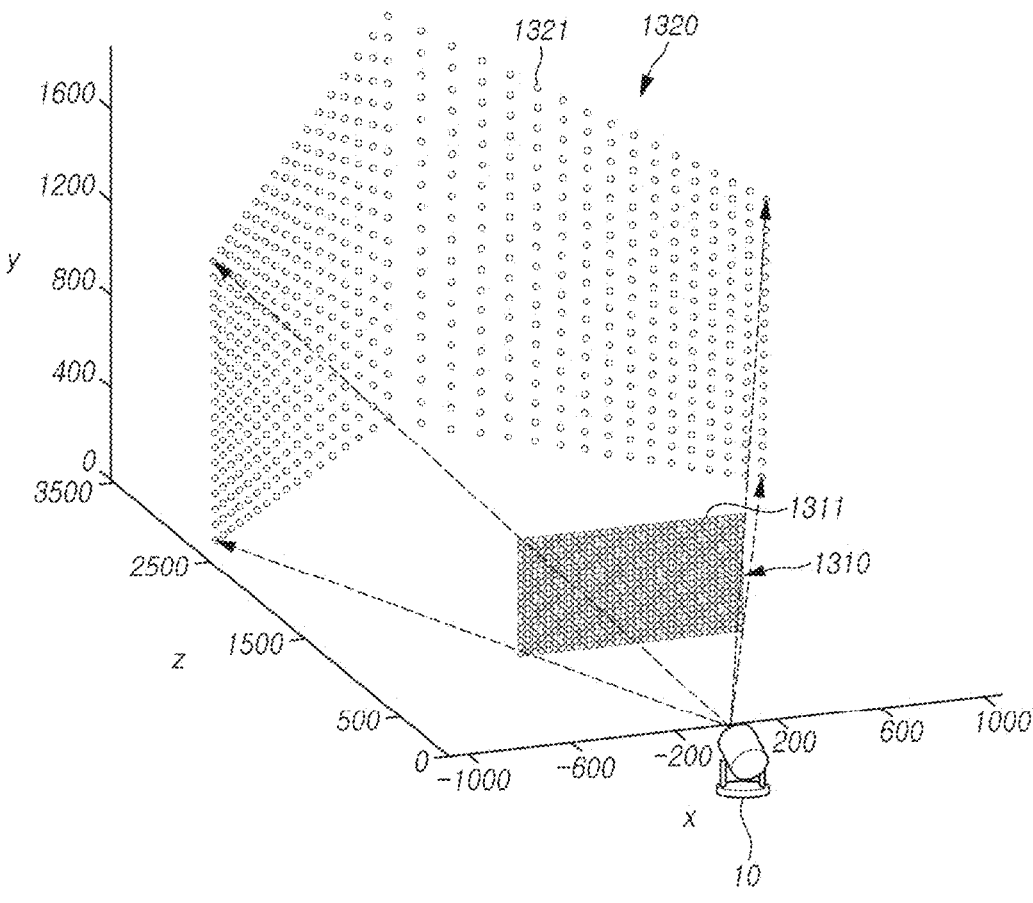
Figure 14:
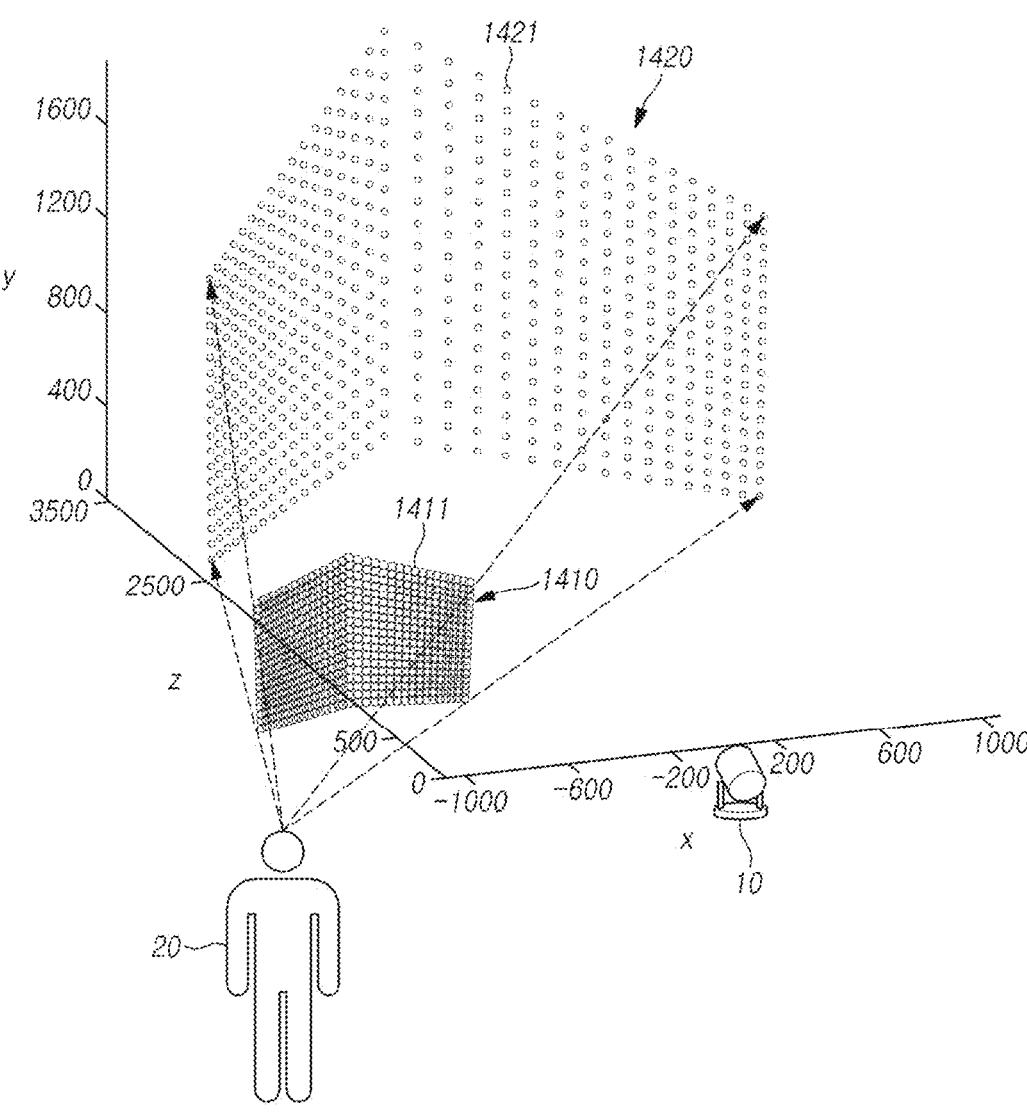
Figure 15:
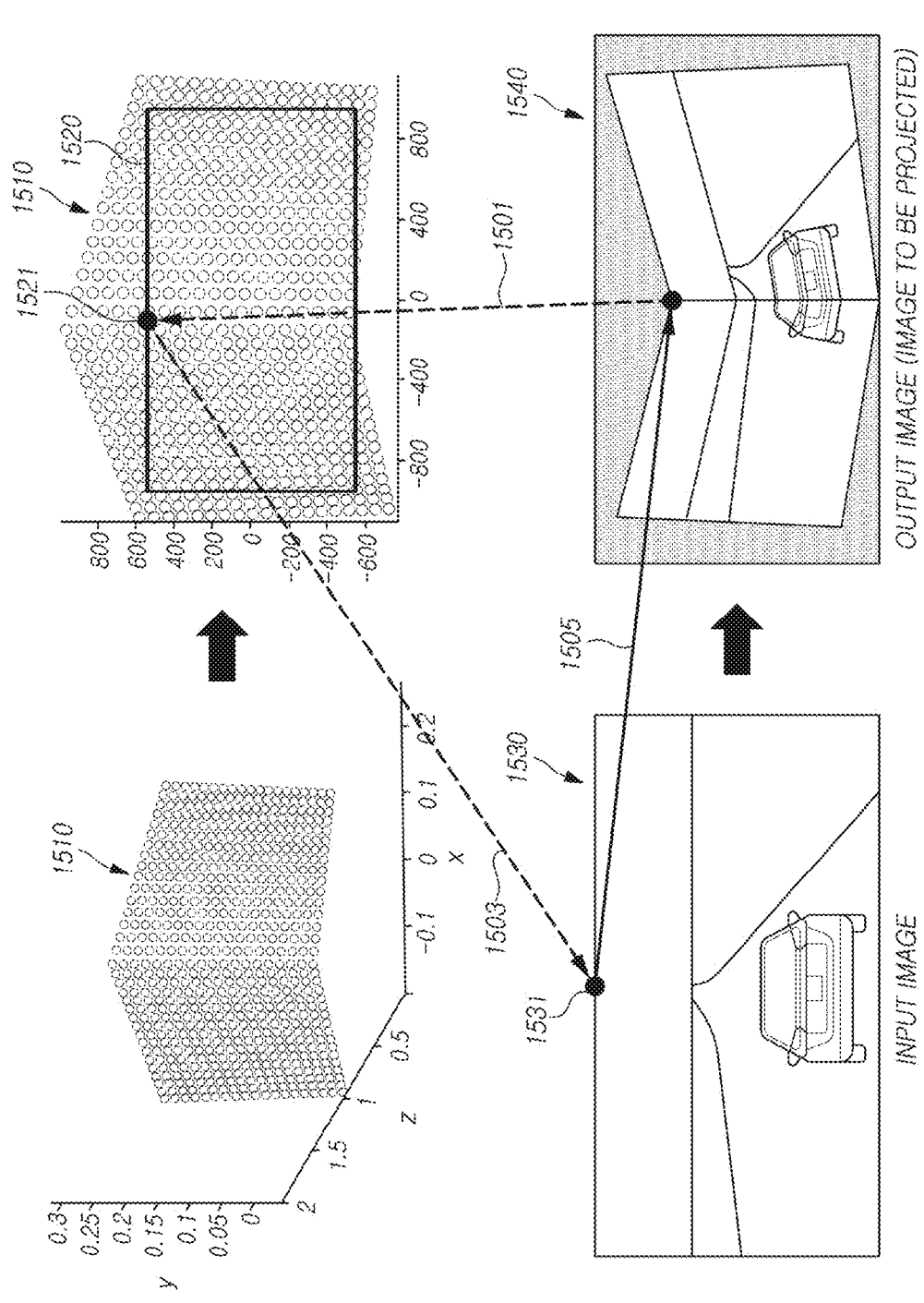

FIG. 4 is a signal flow diagram illustrating example processing for correcting an image to be projected onto a projection surface including multiple surfaces forming a defined angle in an image projection system according to an embodiment of the disclosure;

FIG. 5 is a flowchart illustrating an example process performed in an image projection device according to an embodiment of the disclosure;

FIG. 6 is a flowchart illustrating an example process performed in a remote control device according to an embodiment of the disclosure;

FIG. 7 is a block diagram illustrating an example configuration of an image projection device according to an embodiment of the disclosure;

FIG. 8 is a block diagram illustrating an example configuration of a remote control device according to an embodiment of the disclosure;

FIG. 9 is a flowchart illustrating an example method for performing image correction in an image projection device according to an embodiment of the disclosure;

FIG. 10 is a diagram including a table illustrating an example of obtaining a 3D position sample of a projection point included in a projection surface in an image projection device according to an embodiment of the disclosure;

FIG. 11 includes graphs illustrating an example in which 3D position samples corresponding to a projection point included in a projection surface are grouped in an image projection device according to an embodiment of the disclosure;

FIG. 12 includes graphs illustrating an example in which a projection surface is modeled based on 3D position samples grouped in an image projection device according to an embodiment of the disclosure;

FIG. 13 is a graph illustrating a relationship in which a pixel of an image output from an image projection device corresponds to a projection point to be projected onto a projection surface according to an embodiment of the disclosure;

FIG. 14 is a graph illustrating a relationship in which a pixel of an image output by an image projection device at a viewing view point corresponds to a projection point to be projected onto a projection surface according to an embodiment of the disclosure; and FIG. 15 is a diagram illustrating an example of performing image correction in an image projection device according to an embodiment of the disclosure.

In connection with the description of the drawings, the same or similar reference numerals may be used to denote the same or similar elements.

DETAILED DESCRIPTION

Hereinafter, various example embodiments of the disclosure are described in greater detail with reference to the drawings. However, the disclosure may be implemented in other various forms and is not limited to the example embodiments set forth herein. The same or similar reference denotations may be used to refer to the same or similar elements throughout the disclosure and the drawings. Further, for clarity and brevity, no description may be made of well-known functions and configurations in the drawings and relevant descriptions.

Figure 1:
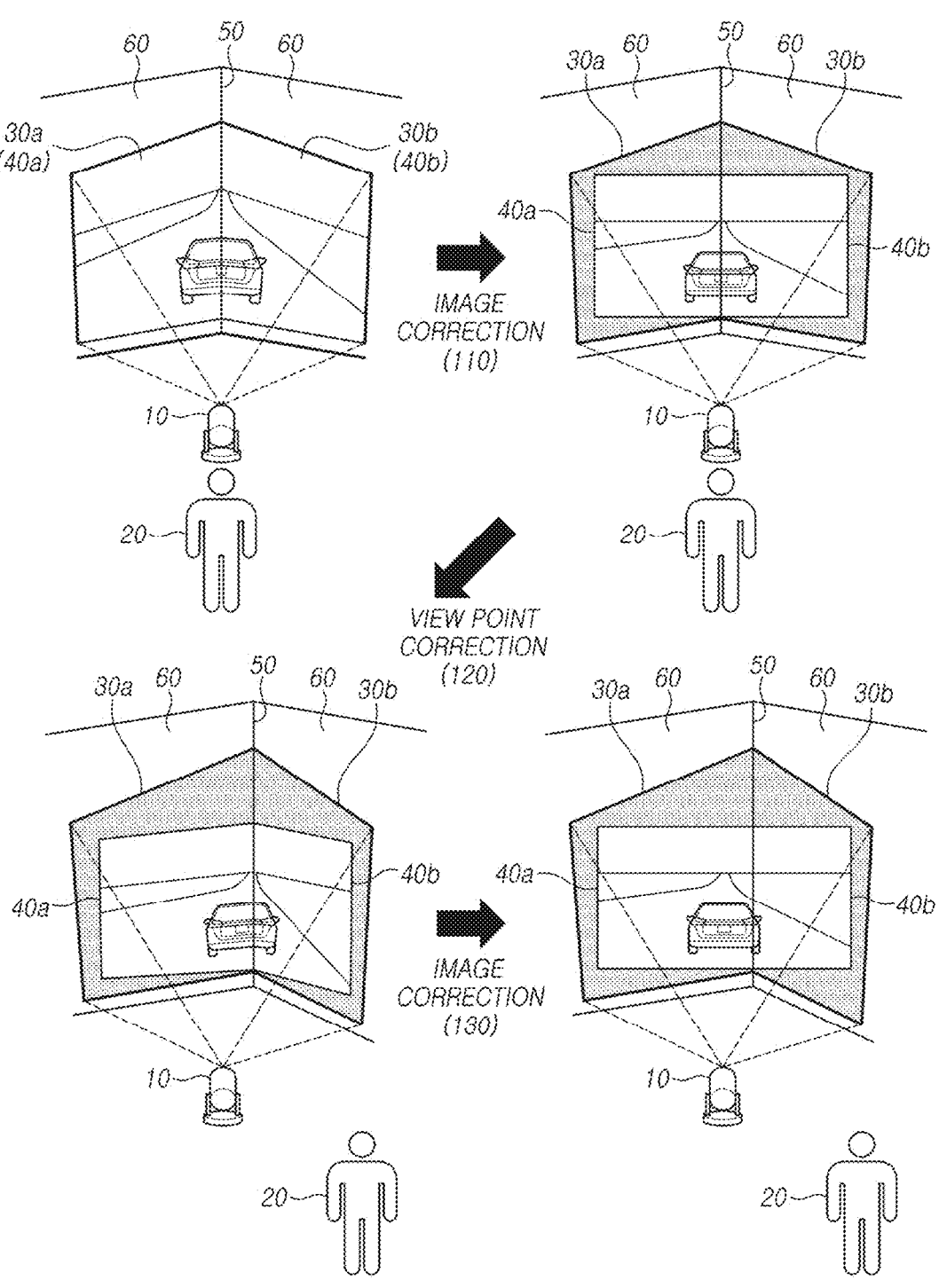
FIG. 1 is a diagram illustrating an example of projecting an image onto a projection surface including multiple surfaces forming a defined angle in an image projection system according to an embodiment of the disclosure.

FIG. 1 is a diagram illustrating an example of projecting an image onto a projection surface including multiple surfaces forming a defined angle in an image projection system according to an embodiment of the disclosure.

Referring to FIG. 1, an image projection system may include an image projection device 10 or a projection surface 60. The image projection device 10 may convert input image data (hereinafter, referred to as an "input image") into an optical signal (hereinafter, referred to as an "output image") and output the optical signal. The output image may be projected onto the projection surface 60. The projection surface 60 may include a projection area 30*a* and 30*b* in which a video according to a content service such as a movie or a game is projected. The projection area 30*a* and 30*b* may include an image display area 40*a* and 40*b* on which an image projected with the output image is to be substantially displayed.

Figure 2:
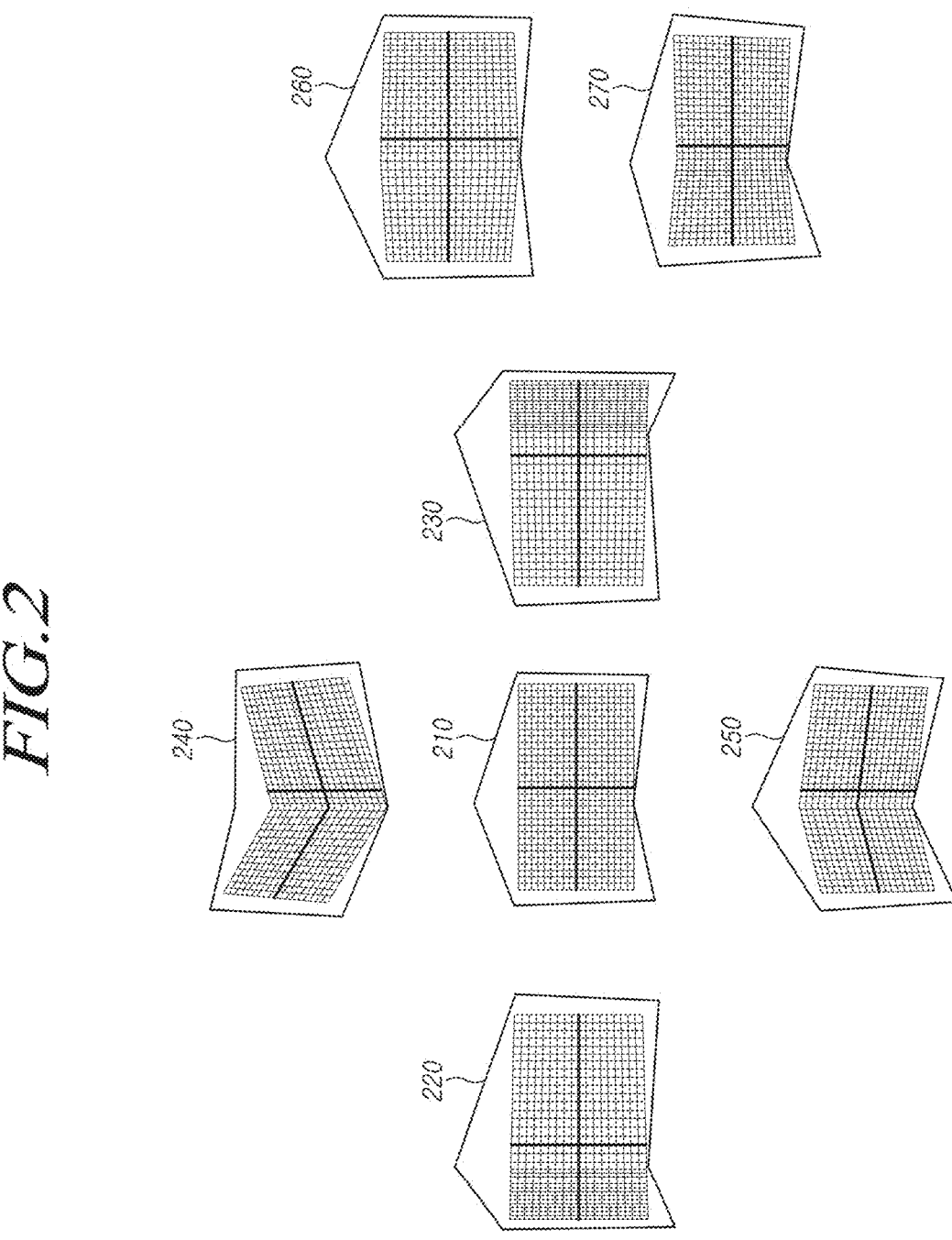
FIG. 2 is a diagram illustrating an example in which distortion occurs in an image projected from an image projection device, due to a viewing position according to an embodiment of the disclosure.

The projection surface 60 may include a surface forming a defined angle with respect to at least one edge 50. The projection surface 60 may be, e.g., a surface bent forward with respect to the edge 50 at a defined angle (e.g., less than 180 degrees). The defined angle may be an intersection angle of multiple surfaces in the projection surface 60 viewed by the viewer. In the following description, the defined angle will be used in the same meaning unless defined otherwise. The projection surface 60 may be, e.g., a surface bent at a defined angle (e.g., more than 180 degrees) rearward with respect to the corner 50. In the drawings, a projection surface 60 bent forward at a defined angle (e.g., less than 180 degrees) is illustrated. In the following detailed description of various embodiments, the projection surface 60 bent at a defined angle (e.g., less than 180 degrees) forward is assumed. However, various embodiments to be described below may be applied to a projection surface bent at a defined angle (e.g., more than 180 degrees) rearward. In this case, the image projected onto the projection surface 60 by the image projection device 1 (hereinafter, referred to as a "projection image") may be distorted (see the first view). The substantial image displayed in the image display area 40*a* and 40*b* included in the projection area 30*a* and 30*b* may be distorted due to a difference in size between the pixels to be displayed at the first position (e.g., near the corner 50) and the second position (e.g., near the edge line horizontal to the corner 50) having different distances to be reached by the output image with respect to the viewpoint of the user 20. The distortion occurring in the projection image may be different from the illustrated distortion. For example, the distortion may occur in a shape opposite to the distortion occurring in the projection image shown. As illustrated, the projection images on the projection areas 30*a* and 30*b* of the projection surface 60 bent forward at a defined angle (e.g., less than 180 degrees) may have shapes inclined downward while traveling in two opposite directions from the corner 50. FIG. 2 illustrates an example of distortion that may occur for each view point in the projection images on the projection areas 30*a* and 30*b* of the projection surface 60 bent forward at a defined angle (e.g., less than 180 degrees). Although not shown, the projection images on the projection surface bent rearward at a defined angle (e.g., more than 180 degrees) may have shapes inclined upward while traveling in two opposite directions from the corner.

The image projection device 10 may output an output image corrected through the image correction 110. The corrected output image may be an image corrected using the position of the image projection device 10 as the view point. The corrected image may be an image obtained by adjusting the pixel value corresponding to each projection point considering the distance to be reached for each projection point output by the image projection device 10 and included in the projection surface 60. The corrected output image may be projected onto the projection area 30*a* and 30*b*. At the viewing position corresponding to the position of the image projection device 10, the user 20 may view an image having an undistorted shape (e.g., a rectangle) displayed on the image display area 40a and 40b of the projection area 30a and 30b (see the second view).

As described above, in a situation in which the projection image is displayed by the output image which the image correction 110 has been performed according to a reference view point (e.g., the position of the image projection device 10), if the user 20 moves to another position, the user views a distorted projection image due to the changed view point (120, see the third view). The distortion may occur differently depending on where the changed view point is.

If the view point (e.g., point of view) of the user 20 is changed, the image projection device 10 may perform an image correction 130 on the output image again considering the changed view point. The image correction 130 is performed again so that the output image output by the image projection device 10 may be viewed as an undistorted projection image at the changed view point (see the fourth view).

FIG. 2 is a diagram illustrating an example in which distortion occurs in an image projected from an image projection device (e.g., the image projection device 10 of FIG. 1), due to a viewing position according to an embodiment of the disclosure.

Referring to FIG. 2, if an output image corrected by the image projection device 10 considering a reference view point (e.g., the position of the image projection device 10) is projected onto a projection surface (e.g., the projection surface 60 of FIG. 1) including at least two surfaces bent at a defined angle with respect to the corner 50, a normal projection image that is not distorted in the image display area 40a and 40b may be viewed at the reference view point (210). However, at a view point other than the reference view point, the projection images of the image display areas 40a and 40b may be distorted.

For example, if the changed view point is positioned relatively to the left on the same horizontal axis as the reference view point, the first image display area 40a on the first surface of the image display area may be viewed relatively narrower than the second image display area 40b on the second surface. In this case, the pixels of the first projection points included in the first image display area 40a may be relatively smaller in size than the pixels of the second projection points included in the second image display area 40b, or may be densely disposed. This may cause distortion of the projection image viewable at the changed view point (see 220).

For example, if the changed view point is positioned relatively on the right side on the same horizontal axis as the reference view point, the second image display area 40b on the second surface of the image display area may be viewed relatively narrower than the first image display area 40a on the first surface. In this case, the pixels of the second projection points included in the second image display area 40b may be relatively smaller in size than the pixels of first projection points included in the first image display area 40a, or may be densely disposed. This may cause distortion of the projection image viewable at the changed view point (see 230).

For example, if the changed view point is positioned relatively above the same vertical axis as the reference view point, the vicinity of two opposite edges may be viewed as protruding compared to the vicinity of the corner (e.g., the corner 50 of FIG. 1) (see 240). For example, if the changed view point is positioned relatively below the same vertical axis as the reference view point, the vicinity of the corner (e.g., the corner 50 of FIG. 1) may be viewed as protruding compared to the vicinity of two opposite edges (see 250). For example, if the changed view point is closer to the projection surface 60 than the reference view point, the vicinity of the corner (e.g., the corner 50 of FIG. 1) may be viewed as protruding relatively compared to the vicinity of two opposite edges (see 260). For example, if the changed view point is farther away from the projection surface 60 than the reference view point, the vicinity of two opposite edges may be viewed as protruding relatively compared to the vicinity of the corner (e.g., the corner 50 of FIG. 1) (see 270).

The above-described examples of distortion may be referred to in defining a mapping relationship between the pixel value of the input image and the pixel value of the output image during image correction based on the view point to be described below.

Figure 3:
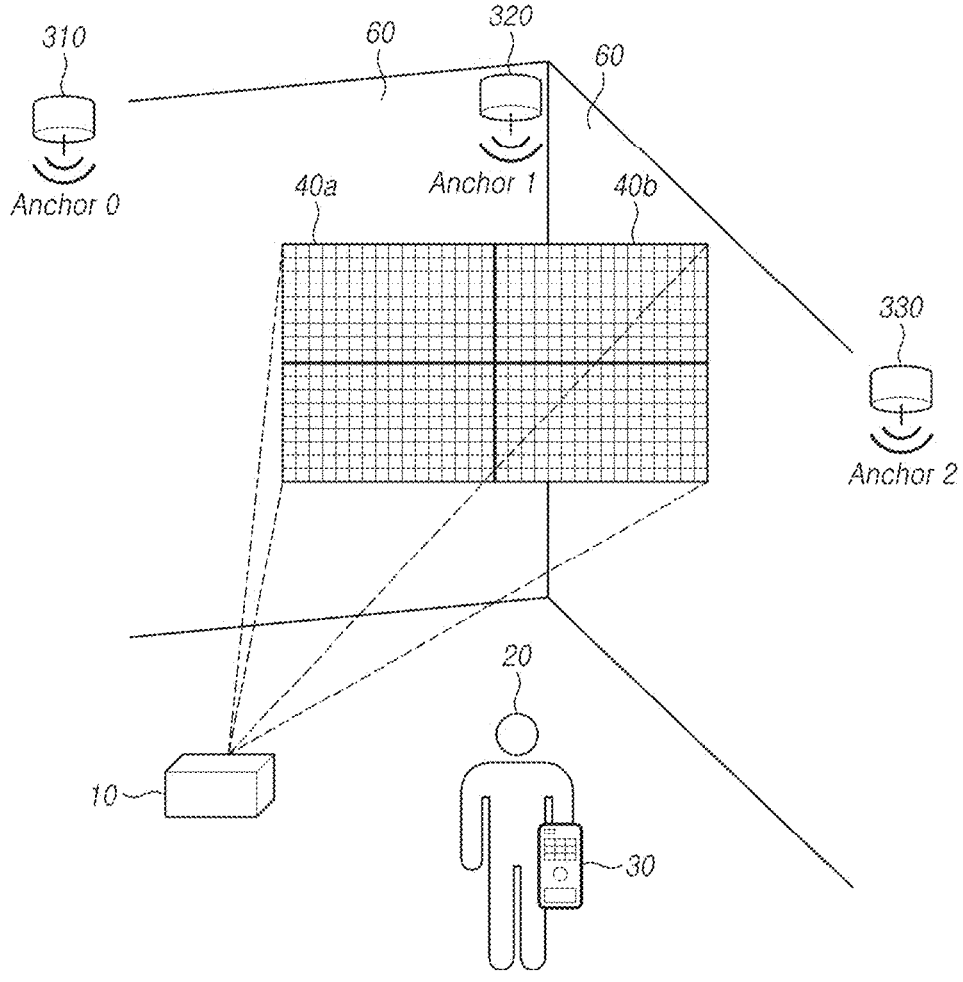
FIG. 3 is a diagram illustrating an example configuration of an image projection system according to an embodiment of the disclosure.

FIG. 3 is a diagram illustrating an example configuration of an image projection system (e.g., the image projection system of FIG. 1) according to an embodiment of the disclosure.

Referring to FIG. 3, in the case of an indoor space, the image projection system may include at least three sensors (e.g., Anchor 0 310, Anchor 1 320, and Anchor 2 330) installed on an upper portion (e.g., a ceiling). The image projection system may include an image projection device (e.g., the image projection device 10 of FIG. 1). The output image output by the image projection device 10 may be projected onto the projection surface 60. The output image projected onto the projection surface 60 may display a substantial projection image in the image display area 40a and 40b of the projection areas (e.g., the projection areas 30a and 30b of FIG. 1).

Each of the at least three sensors 310, 320, and 330 may measure a distance to the image projection device 10 and provide the measured distance information to the image projection device 10. The image projection device 10 may obtain its position using distance information provided by the at least three sensors 310, 320, and 330.

Each of the at least three sensors 310, 320, and 330 may measure a distance to the user 20 and/or the remote control device 30 and provide the measured distance information to the image projection device 10. The image projection device 10 may obtain the position of the user 20 and/or the remote control device 30 using the distance information provided by the at least three sensors 310, 320, and 330. The image projection device 10 may obtain the position of the remote control device 30 using information provided from the remote control device 30. The image projection device 10 may predict the view point at which the user 20 views the projection image displayed on the image display area 40a and 40b using the information provided from the remote control device 30.

The image projection device 10 may correct the output image considering the view point of the user 20. For example, the image projection device 10 may map pixel values included in the first output image which has undergone image correction using its position as the view point to pixels at another position adjusted with respect to the view point of the user 20. With the second output image which has undergone image correction in this way, the substantial image is projected onto the same image display areas 40a and 40b as the first output image, but pixel values projected for each projection point of the image display areas 40a and 40b may be different.

FIG. 4 is a signal flow diagram illustrating an example process for correcting an image to be projected onto a projection surface (e.g., the projection surface 60 of FIG. 1) including multiple surfaces forming a defined angle in an image projection system (e.g., the image projection system of FIG. 1) according to an embodiment of the disclosure.

Referring to FIG. 4, the image projection device 10 may output a reference image (410). For example, the image projection device 10 may generate an initial image to be projected onto a multi-surface projection area (e.g., the projection areas 30*a* and 30*b* of FIG. 1) forming a defined angle in response to an image output request. The initial image may be an image corrected using the position of the image projection device 10 as a view point. The image projection device 10 may output the initial image. The initial image may be projected onto the projection area 30*a* and 30*b*. At the viewing position corresponding to the position of the image projection device 10, an image having an undistorted shape (e.g., a rectangle) displayed on the image display area 40*a* and 40*b* included in the projection area 30*a* and 30*b* may be viewed. However, if the view point of the viewer (e.g., the user 20 of FIG. 1) is different from the position of the image projection device 10, the user 20 may view the image displayed on the image display area 40*a* and 40*b* as distorted due to the position. Examples in which the image displayed in the image display area 40*a* and 40*b* is distorted for each position are as described with reference to FIG. 2.

The remote control device 30 may monitor whether a screen adjustment request occurs depending on the viewing position (420). The screen adjustment may be requested by the user. For example, the remote control device 30 may detect the screen adjustment request when user manipulates a button (e.g., a physical button or a touch button) provided in the user interface (e.g., the user I/F 830 of FIG. 8) for adjustment of the view point at which the user views the image displayed on the projection area 30*a* and 30*b* of the projection surface 60.

The remote control device 30 may generate screen adjustment information in response to the screen adjustment request being generated. The screen adjustment information may be, e.g., control information including directional identification information indicating the direction in which a view point is to be moved. The directional identification information may include an identifier indicating one of front, rear, upper, lower, left, or right directions. The screen adjustment information may be, e.g., control information including location identification information indicating the view point. The screen adjustment information may be, e.g., control information including identification information indicating at least one of the distance or the direction between the image projection device 10 and the remote control device 30. The remote control device 30 may transfer the generated screen adjustment information to the image projection device 10 (430).

The image projection device 10 may receive the screen adjustment information from the remote control device 30 (430). The image projection device 10 may perform image correction based on the screen adjustment information (440). As an example, the image projection device 10 may update pixel values of the image to be projected corresponding to projection points of the projection area 30*a* and 30*b* based on the screen adjustment information. The image projection device 10 may update pixel values of the image to be projected so that the image to be projected onto the image display area 40*a* and 40*b* is viewed as a rectangle at the view point desired by the user 20. To that end, the image projection device 10 may obtain directional identification information indicating the direction in which the view point is to be moved from the screen adjustment information. The directional identification information may include an identifier indicating one of front, rear, upper, lower, left, or right directions. To that end, the image projection device 10 may obtain location identification information indicating the view point from the screen adjustment information. To that end, the image projection device 10 may obtain identification information indicating at least one of the distance or the direction between the image projection device 10 and the remote control device 30 from the screen adjustment information. The image projection device 10 may predict the view point which the user 20 wants to adjust based on identification information indicating at least one of the distance or the direction between the image projection device 10 and the remote control device 30.

The image projection device 10 may output a corrected image based on the view point which is moved by the request of the user 20 (450). The image output by the image projection device 10 may be projected onto the projection area 30*a* and 30*b* of the projection surface 60. The image projected onto the projection area 30*a* and 30*b* may be displayed on the image display area 40*a* and 40*b* included in the projection area 30*a* and 30*b*. In this case, the user 20 may view the image displayed on the image display area 40*a* and 40*b* as a rectangular shape without distortion, as when viewing it through a physical display.

According to an example, the pixel values of the image output by the image projection device 10 may be updated by correction so that the image to be displayed in the image display area 40*a* and 40*b* is viewed in a standardized shape like the initial image at the view point of the user. The initial image may be an image displayed in the image display area 40*a* and 40*b* prior to the image output by the image projection device 10.

As described above, when the image displayed in the image display area 40*a* and 40*b* including at least two surfaces bent at a defined angle with respect to a corner (e.g., the corner 50 of FIG. 1) by the image projection device 10 is distorted, the user 20 may manipulate the remote control device 30 to use remote control for viewing an undistorted image at his or her view point.

FIG. 5 is a flowchart illustrating an example process performed in an image projection device (e.g., the image projection device 10 of FIG. 1) according to an embodiment of the disclosure.

Referring to FIG. 5, in operation 511, the image projection device 10 may determine whether an image output request is generated. The image output request may be generated when an image output is requested by the user (e.g., the user 20 of FIG. 1) in an activation mode in which the image projection device 10 is capable of operating normally. The video output request may be generated by executing a defined content service, such as playing video (e.g., a movie, a TV show, etc.).

In operation 513, the image projection device 10 may output a reference image based on a first layout. The first layout may include information about a screen layout configured so that distortion does not occur when an initial image projected onto a multi-screen projection area (e.g., the projection areas 30*a* and 30*b* of FIG. 1) forming a defined angle by the image projection device 10 is viewed at a defined reference view point. Accordingly, if the user 20 views the reference image projected onto the projection area 30*a* and 30*b* at the reference view point, the user 20 may be provided with an undistorted image. The reference view point may correspond to, e.g., the position of the image projection device 10.

According to an example, the reference image may be an image corrected using the position of the image projection device 10 as the view point. The image projection device 10 may output the reference image. The reference image may be projected onto the projection area 30a and 30b. At the viewing position corresponding to the position of the image projection device 10, an image having an undistorted shape (e.g., a rectangle) displayed on the image display area 40a and 40b included in the projection area 30a and 30b may be viewed. However, if the view point of the viewer (e.g., the user 20 of FIG. 1) is different from the position of the image projection device 10, the viewer may view the image displayed on the image display area 40a and 40b as distorted due to the position. Examples in which the image displayed in the image display area 40a and 40b is distorted for each position are as described with reference to FIG. 2.

In operation 515, the image projection device 10 may monitor whether a screen adjustment event depending on a viewing position occurs. The screen adjustment may be requested by the remote control device 30. For example, when the user 20 manipulates a button (e.g., a physical button or a touch button) provided in the remote control device 30 to adjust the view point of viewing the image displayed on the projection area 30a and 30b of the projection surface 60, the image projection device 10 may monitor the occurrence of the screen adjustment event. The image projection device 10 may obtain screen adjustment information from the remote control device 30 by the occurrence of the screen adjustment event. The screen adjustment information may be, e.g., control information including directional identification information indicating the direction in which a view point is to be moved. The directional identification information may include an identifier indicating one of front, rear, upper, lower, left, or right directions. The screen adjustment information may be, e.g., control information including location identification information indicating the view point. The screen adjustment information may be, e.g., control information including identification information indicating at least one of the distance or the direction between the image projection device 10 and the remote control device 30.

In operation 517, the image projection device 10 may configure a second layout for screen adjustment based on the screen adjustment information and output a corrected image based on the second layout. As an example, the image projection device 10 may update pixel values of the image to be projected corresponding to projection points of the projection area 30a and 30b based on the screen adjustment information. The image projection device 10 may update pixel values of the image to be projected so that the image to be projected onto the image display area 40a and 40b is viewed as a rectangle at the view point desired to be adjusted by the user 20. To that end, the image projection device 10 may obtain directional identification information indicating the direction in which the view point is to be moved from the screen adjustment information. The directional identification information may include an identifier indicating at least one of front, rear, upper, lower, left, or right directions. To that end, the image projection device 10 may obtain location identification information indicating the view point from the screen adjustment information. To that end, the image projection device 10 may obtain identification information indicating at least one of the distance or the direction between the image projection device 10 and the remote control device 30 from the screen adjustment information. The image projection device 10 may predict the adjusted view point which the user 20 wants based on identification information indicating at least one of the distance or the direction between the image projection device 10 and the remote control device 30. The image projection device 10 may map the pixel values included in the input image to a corresponding pixel among the pixels included in the output image based on the view point moved by the request of the user 20.

According to an example, the pixel values of the image to be projected by the image projection device 10 may be updated by correction so that the image to be displayed in the image display area 40a and 40b is viewed in a standardized shape like the initial image at the view point of the user 20. The initial image may be an image displayed in the image display area 40a and 40b prior to the image to be projected by the image projection device 10. The initial image may be, e.g., an image projected with respect to a defined view point (e.g., the view point viewed from the position where the image projection device 10 is placed in a real space) in response to an image output request.

The image projection device 10 may output the corrected output image. The image output by the image projection device 10 may be projected onto the projection area 30a and 30b of the projection surface 60. The image projected onto the projection area 30a and 30b may be displayed on the image display area 40a and 40b included in the projection area 30a and 30b. In this case, the user 20 may view the image displayed on the image display area 40a and 40b as a rectangular shape without distortion, as when viewing it through a physical display.

In operation 519, the image projection device 10 may determine whether screen output termination occurs. When screen output termination does not occur, the image projection device 10 may repeatedly perform operation 515 and operation 517. If the end of the screen output occurs, the image projection device 10 may stop the image output in operation 521.

FIG. 6 is a flowchart illustrating an example process performed in a remote control device (e.g., the remote control device 30 of FIG. 3) according to various embodiments.

Referring to FIG. 6, in operation 611, the remote control device 30 may determine whether the screen remote control function is activated. The remote control function may be a function of remotely controlling the operation of an electronic device (e.g., the image projection device 10 of FIG. 1) connected through a communication link based on a defined communication protocol (e.g., a short-range communication protocol such as Bluetooth, wireless fidelity (Wi-Fi) direct, or IrDA). As an example, the remote control device 30 may adjust the view point to be considered by the image projection device 10 to correct the image to be projected onto the projection area 30a and 30b of the projection surface 60 using the screen remote control function.

If the screen remote control function is activated, the remote control device 30 may detect a screen adjustment request depending on the viewing position in operation 613. The screen adjustment may be requested by the user. For example, the user may manipulate a button (e.g., a physical button or a touch button) provided in the user interface (e.g., the user I/F 830 of FIG. 8) to generate an event of adjusting the view point of viewing the image displayed on the projection area 30a and 30b of the projection surface 60.

In operation 615, the remote control device 30 may generate screen adjustment information in response to the occurring event. The screen adjustment information may be, e.g., control information including directional identification information indicating the direction in which a view point is to be moved. The directional identification information may include an identifier indicating one of front, rear, upper, lower, left, or right directions. The screen adjustment information may be, e.g., control information including location identification information indicating the view point. The screen adjustment information may be, e.g., a control signal including identification information indicating at least one of the distance or the direction between the image projection device 10 and the remote control device 30.

In operation 615, the remote control device 30 may transfer the generated screen adjustment information to the image projection device 10 based on a defined communication protocol.

FIG. 7 is a block diagram illustrating an example configuration of an image projection device (e.g., the image projection device 10 of FIG. 1) according to an embodiment of the disclosure.

Referring to FIG. 7, an image projection device 10 may include at least one processor (e.g., including processing circuitry) 710, a transceiver 720, a memory 730, and/or an image projector 740. The image projection device 10 may include a user interface (I/F).

The user I/F may be configured to receive information from the user. For example, the user I/F may receive a command or data to be used by a component (e.g., the at least one processor 710) of the image projection device 10, from the outside (e.g., the user) of the image projection device 10. The user I/F may include, e.g., a microphone, a mouse, a keyboard, a key (e.g., a button), a remote controller, or a digital pen (e.g., a stylus pen).

The user I/F may be configured to transfer information to the user. For example, the user I/F may output sound signals to the outside of the image projection device 10. The user I/F may include, e.g., a speaker or a receiver. The speaker may be used for general purposes, such as playing multimedia or playing record. The receiver may be used for receiving incoming calls. The receiver may be implemented as separate from, or as part of the speaker.

The processor 710 may be implemented as one or more integrated circuit (IC) chips and may perform various data processing. For example, the processor 710 (or an application processor (AP)) may be implemented as a system on chip (SoC) (e.g., one chip or chipset). The processor 710 may include sub components including a central processing unit (CPU), a graphics processing unit (GPU), a neural processing unit (NPU), an image signal processor (ISP), a display controller, a memory controller, a storage controller, a communication processor (CP), and/or a sensor interface. The sub components are merely examples. For example, processor 710 may further include other sub components. For example, some sub components may be omitted from the processor 710. For example, some sub components may be included as separate components of the image projection device 10 outside the processor 710. For example, some sub components may be included in other components (e.g., a display and an image sensor). The processor 710 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors"

are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 710 (e.g., a CPU or a central processing circuit) may be configured to control sub components based on execution of instructions stored in the memory (e.g., a volatile memory and/or a non-volatile memory). The GPU (or the graphics processing circuit) may be configured to execute parallel computations (e.g., rendering). The NPU (or neural processing circuit) may be configured to execute operations (e.g., convolution computations) for an artificial intelligence model. The ISP (or the image signal processing circuit) may be configured to process a raw image obtained through the image sensor into a format suitable for a component in the image projection device 10 or a sub component in the processor. The display controller (or the display control circuit) may be configured to process an image obtained from the CPU, the GPU, the ISP, or the memory 730 (e.g., a volatile memory) into a format suitable for projection onto the projection surface. The memory controller (or the memory control circuit) may be configured to control to read data from the volatile memory and write the data to the volatile memory. The storage controller (or the storage control circuit) may be configured to read data from the non-volatile memory and control to write the data to the non-volatile memory. The CP (communication processing circuit) may be configured to process data obtained from a sub component in the processor 710 into a format suitable for transmitting the data to another electronic device through the transceiver 720, or to process data obtained from the other electronic device (e.g., a remote control device (e.g., the remote control device 30 of FIG. 3)) through the transceiver 720 into a format suitable for processing by the sub component. The sensor interface (or sensing data processing circuit or sensor hub) may be configured to process data about the state of the image projection device 10 and/or the state around the image projection device 10, obtained through an internal sensor (e.g., a time-of-flight (ToF) sensor) or an external sensor (e.g., one or more position measurement sensors (anchors)), into a format suitable for a sub component in the processor 710.

According to an example, the sensing data obtained through the internal sensor may include information for obtaining position coordinates of three-dimensional (3D) samples to be referred to for correction of the projection image. The 3D samples may correspond to some or all of projection points included in the projection area (e.g., the projection area 30a and 30b of FIG. 1) of the projection surface (e.g., the projection surface 60 of FIG. 1) from a defined position. The information for obtaining the position coordinates of the 3D samples may include, e.g., information about the distance and the direction from the defined position to the 3D samples. The processor 710 may classify 3D samples using the sensing data and group the classified samples. The position information obtained for the grouped samples may be used to model the multiple surfaces included in the projection area 30a and 30b.

According to an example, the sensing data obtained through the external sensor may include information to be used to obtain the position of the image projection device 10. The sensing data may include distance information to the image projection device 10 measured by at least three sensors (e.g., Anchor 0 310, Anchor 1 320, and Anchor 2 330 of FIG. 3) installed at an upper portion. The processor 710 may identify the position of the image projection device 10 using the sensing data. The processor 710 may generate an image to be first projected based on the position of the image projection device 10. The image to be first projected may be an image corrected so that the image projected onto the projection area 30a and 30b at the position of the image projection device 10 may be displayed as a flat surface without distortion due to the multiple surfaces forming a defined angle.

The transceiver 720 may include various communication circuitry and be configured to exchange information with at least one electronic device (e.g., the remote control device 30 of FIG. 3 or Anchor 0 310, Anchor 1 320, or Anchor 2 330 of FIG. 3). The transceiver 720 may transmit and receive data or signals to and from the remote control device 30 or external sensors (e.g., Anchor 0 310, Anchor 1 320, or Anchor 2 330) under the control of the processor 710. The transceiver 720 may include, but is not limited to, a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, or a microwave (uWave) communication unit, corresponding to the performance and structure of the image projection device 10.

According to an example, the transceiver 720 may establish a direct (e.g., wired) communication channel or a wireless communication channel with the remote control device 30 or support communication through the established communication channel. The transceiver 720 may include one or more communication processors supporting direct (e.g., wired) communication or wireless communication. The one or more communication processors may be operated independently of the processor 710. The transceiver 720 may include, e.g., a wireless communication module (e.g., a cellular communication module, a short-range wireless communication module, or a global navigation satellite system (GNSS) communication module) or a wired communication module (e.g., a local area network (LAN) communication module or a power line communication module). A corresponding one of these communication modules may communicate with at least one remote control device 30, which is an external electronic device, via a network (e.g., a short-range communication network, such as Bluetooth™, wireless-fidelity (Wi-Fi) direct, or infrared data association (IrDA)) or a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other.

The image projector 740 may be configured to output an image to be projected onto the projection area 30a and 30b of the projection surface 60 for screen output. For example, the image projector 740 may convert an electrical signal provided from the processor 710 into an image to be projected, which is an optical signal, and output the image toward the projection area 30a and 30b. The electrical signal provided by the processor 710 may correspond to image data such as a photo or a video.

The processor 710 may execute software to control at least one other component (e.g., a hardware or software component) such as the user I/F, the transceiver 720, or the image projector 740, which is electrically connected thereto, or may process or compute various data. As at least part of the data processing or computation, the processor 710 may store instructions or data received from other components (e.g., the user I/F or the transceiver 720) in the memory 730 (e.g., volatile memory), or process the instructions or data stored in the memory 730, and store the processed resulting data in the memory 730.

According to an example, the processor 710 may correct the image to be projected onto the multi-surface projection area 30a and 30b forming a defined angle considering the viewing position. The processor 710 may generate an image to be projected onto the projection areas 30a and 30b including image display areas (e.g., the image display areas 40a and 40b of FIG. 1) in which an image is to be substantially displayed on the projection surface 60 including at least two surfaces bent at a defined angle with respect to an corner (e.g., the corner 50 of FIG. 1). The processor 710 may control the image projector 740 to output the image to be projected.

The processor 710 may generate an initial image to be projected onto the multi-surface projection area 30a and 30b forming a defined angle in response to the image output request. The initial image to be projected may be an image corrected using the position of the image projection device 10 as the view point in the real space. The processor 710 may control the image projector 740 to output the initial image to be projected. The initial image may be projected onto the projection area 30a and 30b. At the position of the image projection device 10, an image having an undistorted shape (e.g., a rectangular shape) may be viewed in the image display area 40a and 40b of the projection area 30a and 30b.

The processor 710 may receive, through the transceiver 720, a control signal for changing the view point at which the projection area 30a and 30b is viewed from the remote control device 30. The processor 710 may update pixel values of the image to be projected corresponding to projection points of the projection area 30a and 30b in response to the control signal. The processor 710 may update the pixel values of the image to be projected so that the image to be displayed in the image display area 40a and 40b is viewed as a rectangle at the view point. The control signal may include directional identification information indicating a direction in which the view point is to be moved. The directional identification information may include an identifier indicating one of front, rear, upper, lower, left, or right directions. The control signal may include location identification information indicating the view point. The control signal may include identification information indicating at least one of a distance or a direction between the image projection device 10 and the remote control device 30. The processor 710 may predict the view point based on identification information indicating at least one of a distance or a direction between the image projection device 10 and the remote control device 30 included in the control signal.

According to an example, the processor 710 may obtain coordinate values indicating the positions of some or all of the projection points included in the projection area 30a and 30b. For example, the processor 710 may obtain coordinate values indicating the positions of some or all of the projection points based on data sensed by an internal or external sensor (e.g., a ToF sensor). The processor 710 may model at least two surfaces included in the projection area 30a and 30b based on the obtained coordinate values. The processor 710 may obtain first coordinate values indicating the positions of the projection points at which pixel values of the image to be projected on the at least two surfaces are projected. The processor 710 may convert the obtained first coordinate values into second coordinate values with respect to the view point. The processor 710 may determine the image display area 40a and 40b by mapping the projection points to a two-dimensional (2D) plane based on the second coordinate value. The processor 710 may set pixel values of the input image as target pixel values to be projected onto projection points included in the image display area 40a and 40b in the image to be projected.

To perform the above-described operations, the processor 710 may include a distance measurement module 711, a position recognition module 713, and/or an image correction module 715, each of which may include various processing circuitry and/or executable program instructions.

The distance measurement module 711 may obtain coordinate values indicating positions of target projection points to be referred to for modeling among the projection points included in the projection area 30a and 30b. For example, the distance measurement module 711 may identify distances and directions to the target projection points based on data sensed by an internal or external sensor (e.g., a ToF sensor), and may obtain coordinate values indicating positions of the target projection points based thereon.

The position recognition module 713 may receive distance information to the image projection device 10 measured by at least three externally installed sensors (e.g., Anchor 0 310, Anchor 1 320, and Anchor 2 330 of FIG. 3). The position recognition module 713 may identify the position of the image projection device 10 using the sensing data.

The image correction module 715 may correct the image to be projected onto the multi-surface projection area 30a and 30b forming a defined angle considering the viewing position. The image correction module 715 may generate an image to be projected onto the projection area 30a and 30b including the image display area 40a and 40b in which the image is to be substantially displayed on the projection surface 60 including at least two surfaces bent at a defined angle with respect to the corner (e.g., the corner 50 of FIG. 1). The image correction module 715 may control the image projector 740 to output the image to be projected.

The image correction module 715 may generate an initial image to be projected onto the multi-surface projection area 30a and 30b forming a defined angle in response to the image output request. The initial image to be projected may be an image corrected using the position of the image projection device 10 identified by the position recognition module 713 as the view point. The image correction module 715 may control the image projector 740 to output the initial image to be projected. The initial image may be projected onto the projection area 30a and 30b. At the position of the image projection device 10, an image having an undistorted shape (e.g., a rectangular shape) may be viewed in the image display area 40a and 40b of the projection area 30a and 30b.

According to an example, the image corrected by the image correction module 715 may be an image in which pixel values are updated so that the image to be displayed in the image display area 40a and 40b is viewed in a standardized shape like the initial image at the view point of the user 20. The initial image may be an output image 760 displayed in the image display area 40a and 40b prior to the image to be projected by the image projector 740. The initial image may be, e.g., an image projected by the image projector 740 with respect to a defined view point (e.g., the view point viewed from the position where the image projection device 10 is placed in a real space) in response to an image output request.

FIG. 8 is a block diagram illustrating an example configuration of a remote control device (e.g., the remote control device 30 of FIG. 3) according to an embodiment of the disclosure.

Referring to FIG. 8, a remote control device 30 may include at least one processor (e.g., including processing circuitry) 810, a transceiver 820, and/or a user interface (I/F) (e.g., including various circuitry) 830. The remote control device 30 may generate a remote control signal in response to the user's request, and may provide the generated remote control signal to an image projection device (e.g., the image projection device 10 of FIG. 11).

The processor 810 may be implemented as one or more integrated circuit (IC) chips and may perform various data processing. For example, the processor 810 (or an application processor (AP)) may be implemented as a system on chip (SoC) (e.g., one chip or chipset). The processor 810 (e.g., a CPU or a central processing circuit) may be configured to control sub components based on execution of instructions stored in a recording medium, such as memory (e.g., a volatile memory and/or a non-volatile memory). The processor 810 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 810 may be configured to process the data obtained from a sub component into a format appropriate for transmission to another electronic device (e.g., the image projection device 10) through the transceiver 820 or process the data obtained through the transceiver 820 from the other electronic device (e.g., the image projection device 10) into a format appropriate for processing of the sub component.

The transceiver 820 may include various communication circuitry and be configured to exchange information with at least one electronic device (e.g., the image projection device 10 of FIG. 1). The transceiver 820 may transmit and receive data or signals to and from the image projection device 10 under the control of the processor 810. The transceiver 820 may include, but is not limited to, a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultrawideband (UWB) communication unit, an Ant+ communication unit, or a microwave (uWave) communication unit, corresponding to the performance and structure of the remote control device 30.

According to an example, the transceiver 820 may establish a direct (e.g., wired) communication channel or a wireless communication channel with the image projection device 10 or support communication through the established communication channel. The transceiver 820 may include one or more communication processors supporting direct (e.g., wired) communication or wireless communication. The one or more communication processors may be operated independently of the processor 810. The transceiver 820 may include, e.g., a wireless communication module (e.g., a cellular communication module, a short-range wireless communication module, or a global navigation satellite system (GNSS) communication module) or a wired communication module (e.g., a local area network (LAN) communication module or a power line communication module). A corresponding one of these communication modules may communicate with at least one image projection device 10, which is an external electronic device, via a network (e.g., a short-range communication network, such as Bluetooth™, wireless-fidelity (Wi-Fi) direct, or infrared data association (IrDA)) or a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other.

The user I/F 830 may include various circuitry and be configured to receive information from the user. For example, the user I/F 830 may generate a command or data to be used in a component (e.g., at least one processor 810) of the remote control device 30, in response to the user's manipulation. The user I/F 830 may include, for example, a microphone, a mouse, a keyboard, keys (e.g., buttons), or a digital pen (e.g., a stylus pen).

The user I/F 830 may be configured to transmit information to the user. For example, the user I/F 830 may output sound signals to the outside. The user I/F 830 may include, e.g., a speaker or a receiver. The speaker may be used for general purposes, such as playing multimedia or playing record. The receiver may be used for receiving incoming calls. The receiver may be implemented as separate from, or as part of the speaker.

According to an example, the processor 810 may detect an occurrence of an event for adjusting the view point of viewing the image displayed in the projection area (e.g., the projection area 30a and 30b of FIG. 1) of the projection surface (e.g., the projection surface 60 of FIG. 1) as a button (e.g., a physical button or a touch button) provided in the user I/F 830 is manipulated by the user. The processor 810 may generate screen adjustment information in response to the occurring event. The screen adjustment information may be, e.g., control information including directional identification information indicating the direction in which a view point is to be moved. The directional identification information may include an identifier indicating one of front, rear, upper, lower, left, or right directions. The screen adjustment information may be, e.g., control information including location identification information indicating the view point. The screen adjustment information may be, e.g., control information including identification information indicating at least one of the distance or the direction between the image projection device 10 and the remote control device 30. The processor 810 may control the transceiver 820 to transfer the generated screen adjustment information to the image projection device 10.

FIG. 9 is a flowchart illustrating an example method for performing image correction in an image projection device (e.g., the image projection device 10 of FIG. 1) according to an embodiment of the disclosure.

Referring to FIG. 9, in operation 910, the image projection device 10 may obtain a plurality of samples from a projection area (e.g., the projection area 30a and 30b of FIG. 1). When the projection surface 60 includes at least two surfaces bent at a defined angle, the samples may be 3D samples having different separation distances at a specific view point rather than a flat surface. The position of the 3D sample may be defined by the 3D coordinates (x, y, z). For example, the image projection device 10 may measure the distance and the direction for some or all of projection points included in the projection area 30a and 30b using the distance sensor (e.g., a ToF sensor). The image projection device 10 may obtain projection points corresponding to the 3D samples based on the measured distance and direction.

FIG. 10 is a diagram including a table illustrating an example of obtaining a 3D position sample of a projection point included in a projection area (e.g., the projection area 30a and 30b of FIG. 1) in an image projection device (e.g., the image projection device 10 of FIG. 1) according to an embodiment of the disclosure.

Referring to FIG. 10, the image projection device 10 may sense distance and direction information about projection points corresponding to samples included in the projection area 30a and 30b using a sensor (ToF sensor), and define 3D coordinate value (x, y, z) for each sample based on the sensed distance and direction information. As an example, the projection area 30a and 30b is divided into two areas with respect to one corner 50. The number of samples may not be specified. For example, the number of samples may be adaptively applied considering, e.g., the number of surfaces included in the projection area 30a and 30b and/or the curvature of the projection surface 60. The image projection device 10 may relatively increase the density of samples for a portion in which a position measurement error is highly likely to occur in the projection area 30a and 30b.

In operation 920, the image projection device 10 may classify the plurality of 3D samples into at least two groups. The number of groups for grouping may be determined based on the number easy to distinguish the positions of the plurality of 3D samples. For example, when the projection area 30 includes two surfaces bent at a defined angle, the number of groups for grouping may be two. In operation 920, the image projection device 10 may model the plurality of projection surfaces by classifying and grouping samples distributed at similar positions.

FIG. 11 includes graphs illustrating an example in which 3D position samples corresponding to a projection point included in a projection area (e.g., the projection area 30a and 30b of FIG. 1) are grouped in an image projection device (e.g., the image projection device 10 of FIG. 1) according to an embodiment of the disclosure. FIG. 12 includes graphs illustrating an example in which surfaces included in a projection area (e.g., the projection area 30a and 30b of FIG. 1) are modeled based on 3D position samples grouped in an image projection device (e.g., the image projection device 10 of FIG. 1) according to an embodiment of the disclosure.

Referring to FIGS. 11 and 12, the image projection device 10 may set a reference value (e.g., 0) on the x axis corresponding to the horizontal axis in the coordinate values (x, y, z) of the obtained 3D samples 1100, and may classify first samples 1110 having an x value less than the reference value, second samples 1120 exceeding the reference value, and other ambiguous third samples 1130. The image projection device 10 may group the first samples 1110 into a first group 1210 corresponding to a first projection surface, may group the second samples 1120 into a second group 1220 corresponding to a second projection surface, and may group the third samples 1130 into a third group 1230 that may not be classified as either the first or second projection surface. The first samples 1110 grouped into the first group 1210 may be included in the first projection surface. The second samples 1120 grouped into the second group 1220 may be included in the second projection surface. The image projection device 10 may model the number of projection surfaces included in the projection area 30a and 30b as two.

In operation 930, the image projection device 10 may obtain the positions of projection points at which the pixels of the output image output by the image projection device 10 meet the projection area 30a and 30b.

FIG. 13 is a graph illustrating a relationship in which a pixel of an image output from an image projection device (e.g., the image projection device 10 of FIG. 1) corresponds to a projection point to be projected onto a projection area (e.g., the projection area 30a and 30b of FIG. 1) according to an embodiment of the disclosure.

Referring to FIG. 13, the image projection device 10 may obtain a first coordinate value of a projection point 1321 corresponding to a position at which a pixel 1311 included in an output image 1310 is to be projected onto the projection area 1320. The output image 1310 may be an uncorrected image. The pixels 1311 included in the output image 1310 may be pixels to be projected onto the projection area 1320 by the image projection device 10. Each of the projected pixels may be projected onto any one of the projection points 1321 included in the projection area 1320. The image projection device 10 may obtain the first coordinate value defining the positions of projection points 1321 where pixels 1311 included in the output image 1310 meet the projection area 1320.

In operation 940, the image projection device 10 may determine the second coordinate value corresponding to the first coordinate value in the coordinate system capable of viewing the projection area 30a and 30b at the user's view point. The coordinate system capable of viewing the projection area 30a and 30b may be determined based on the user's view point.

FIG. 14 is a graph illustrating a relationship in which a pixel of an image output by an image projection device (e.g., the image projection device 10 of FIG. 1) at a viewing view point corresponds to a projection point to be projected onto a projection area (e.g., the projection area 30a and 30b of FIG. 1) according to an embodiment of the disclosure.

Referring to FIG. 14, the image projection device 10 may predict the view point of the user 20 and determine the coordinate system 1410 corresponding to the arrangement of pixels of the output image expected if the projection area 30a or 30b is viewed based on the predicted view point. The image projection device 10 may determine the second coordinate value of the projection point 1421 to meet in the projection area 1420 when the pixels 1411 are projected in the determined coordinate system.

In operation 950, the image projection device 10 may obtain the pixel value for each projection point of the projection area 30a and 30b based on the second coordinate value. The pixel value for each projection point may be obtained from a corresponding pixel in the input image. The pixel of the input image to obtain the pixel value may be determined using the second coordinate value. In order to determine the pixel of the input image for obtaining the pixel value, projection points corresponding to the second coordinate value may be converted into coordinate values in a 2D plane.

FIG. 15 includes diagrams and graphs illustrating an example of performing image correction in an image projection device (e.g., the image projection device 10 of FIG. 1) according to an embodiment of the disclosure.

Referring to FIG. 15, the image projection device 10 may convert projection points included in the coordinate system 1510 with respect to the view point of the user 20 into the coordinate value of the 2D coordinate system 1520. The image projection device 10 may determine the pixel to be projected onto the projection point 1521 included in the 2D coordinate system 1520 in the output image 1540 which is the image to be projected (1501).

The image projection device 10 may read the value of the pixel 1531 in the input image 1530 corresponding to the pixel to be projected (1503). The image projection device 10 may map the read pixel value to the pixel value of the pixel determined in the output image 1540 (1505).

By mapping the pixel values of the input image to all the pixels of the output image, the correction of the image to be projected may be completed.

In operation 960, the image projection device 10 may output the output image generated by the pixel values obtained for each projection point to be projected onto the projection area 30a and 30b.

According to an embodiment, a program for executing a method of switching an activation function in the image projection device 10 described above may be recorded in a non-transitory computer-readable storage medium.

According to an example embodiment, the image projection device may include: a transceiver; at least one memory; an image projector; at least one processor, comprising processing circuitry, operably connected to the transceiver, the at least one memory, and/or the image projector. At least one processor, individually and/or collectively, may be configured to: control the image projector to output an image to be projected onto a projection area including an image display area where an image is to be substantially displayed on a projection surface including at least two surfaces bent at a defined angle with respect to a corner; receive a control signal for changing a view point at which the projection area is viewed from a remote control device through the transceiver; update pixel values of the image to be projected corresponding to projection points of the projection area in response to the control signal. Here, the pixel values of the image to be projected may be updated so that an image to be displayed in the image display area is viewed in a standardized shape like an initial image at the view point. The initial image may be an image displayed in the image display area prior to the image to be projected.

According to an example embodiment, at least one processor, individually and/or collectively, may be configured to control the image projector to project the initial image corrected based on a position of the image projection device onto the image display area in response to an image output request.

According to an example embodiment, the control signal may include directional identification information indicating a direction in which the view point is to be moved.

According to an example embodiment, the directional identification information may include an identifier indicating at least one of a front, rear, upper, lower, left, or right direction.

According to an example embodiment, the control signal may include location identification information indicating the view point.

According to an example embodiment, the control signal may include identification information indicating at least one of a distance and/or a direction between the image projection device and the remote control device.

According to an example embodiment, at least one processor, individually and/or collectively, may be configured to predict the view point based on the identification information.

According to an example embodiment, at least one processor, individually and/or collectively, may be configured to: obtain a coordinate value indicating positions of some or all of the projection points; model the at least two surfaces based on the obtained coordinate value; obtain first coordinate values indicating a position of a projection point at which the pixel values of the image to be projected onto the at least two surfaces are to be projected; and convert the obtained first coordinate values into a second coordinate value with respect to the view point.

According to an example embodiment, at least one processor, individually and/or collectively, may be configured to: determine the image display area by mapping the projection points to a two-dimensional (2D) plane based on the second coordinate value; and set pixel values of an input image as target pixel values to be projected onto projection points included in the image display area in the image to be projected.

According to an example embodiment, at least one processor, individually and/or collectively, may be configured to receive a sensing signal provided by at least one sensor installed in an real space through the transceiver; and identify a position of the image projection device using the sensing signal.

According to an example embodiment, a first projection area including a first image display area where a first image in which the pixel values are updated is projected onto the projection surface and displayed in the projection surface may be substantially the same in position as a second projection area including a second image display area where a second image before the pixel values are updated is projected onto the projection surface and displayed.

According to an example embodiment, there may be provided a method for operating an image projection device. The method may comprise: outputting an image to be projected onto a projection area including an image display area where an image is to be substantially displayed on a projection surface including at least two surfaces bent at a defined angle with respect to a corner; receiving a control signal for changing a view point at which the projection area is viewed from a remote control device; updating pixel values of the image to be projected corresponding to projection points of the projection area in response to the control signal. Here, the pixel values of the image to be projected may be updated so that an image to be displayed in the image display area is viewed in a standardized shape like an initial image at the view point. The initial image may be an image displayed in the image display area prior to the image to be projected.

According to an example embodiment, the method may comprise projecting the initial image corrected based on a position of the image projection device onto the image display area in response to an image output request.

According to an example embodiment, the control signal may include directional identification information indicating a direction in which the view point is to be moved.

According to an example embodiment, the directional identification information may include an identifier indicating at least one of a front, rear, upper, lower, left, or right direction.

According to an example embodiment, the control signal may include location identification information indicating the view point.

According to an example embodiment, the method may comprise: predicting the view point based on identification information indicating at least one of a distance and/or a direction between the image projection device and the remote control device included in the control signal.

According to an example embodiment, outputting the image to be projected may include: obtaining a coordinate value indicating positions of some or all of the projection points. Outputting the image to be projected may include: modeling the at least two surfaces based on the obtained coordinate value; obtaining first coordinate values indicating a position of a projection point at which the pixel values of the image to be projected onto the at least two surfaces are to be projected; and converting the obtained first coordinate values into a second coordinate value with respect to the view point.

According to an example embodiment, the method may comprise: determining the image display area by mapping the projection points to a two dimensional (2D) plane based on the second coordinate value; and setting pixel values of an input image as target pixel values to be projected onto projection points included in the image display area in the image to be projected.

According to an example embodiment, the method may comprise: receiving a sensing signal provided by at least one sensor installed in a real space; and identifying a position of the image projection device using the sensing signal.

According to an example embodiment, a first projection area including a first image display area where a first image in which the pixel values are updated is projected onto the projection surface and displayed in the projection surface may be substantially the same in position as a second projection area including a second image display area where a second image before the pixel values are updated is projected onto the projection surface and displayed.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., the memory 730) that is readable by a machine (e.g., the image projection device 10). For example, a processor (e.g., the processor 710) of the machine (e.g., the image projection device 10) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An image projection device, comprising:
a transceiver;
at least one memory storing instructions;
an image projector; and
at least one processor, comprising processing circuitry, operably connected to the transceiver, the at least one memory, and/or the image projector, wherein at least one processor, individually and/or collectively, is configured to execute the instructions to:
control the image projector to output an image to be projected onto a projection area including an image display area where an image is to be substantially displayed on a projection surface including at least two surfaces bent at a defined angle with respect to a corner;
receive a control signal including location identification information related to location of a remote control device from the remote control device through the transceiver;
based on the location identification information included in the control signal, convert first coordinate values into second coordinate values with respect to a view point; and
update pixel values of the image to be projected based on the second coordinate values,
wherein the first coordinate values indicate a position of projection point at which the pixel values of the image to be projected onto the least two surfaces are to be projected,
wherein the pixel values of the image to be projected are updated so that the image to be displayed in the image display area is viewed in a standardized shape of an initial image at the view point, and
wherein the initial image includes an image displayed in the image display area prior to the image to be projected.

2. The image projection device of claim 1, wherein at least one processor, individually and/or collectively, is configured to execute the instructions to: control the image projector to project the initial image corrected based on a position of the image projection device onto the image display area in response to an image output request.

3. The image projection device of claim 1, wherein the control signal includes directional identification information indicating a direction in which the view point is to be moved, and
wherein the directional identification information includes an identifier indicating at least one of a front, rear, upper, lower, left, or right direction.

4. The image projection device of claim 1, wherein the control signal includes identification information indicating at least one of a distance and/or a direction between the image projection device and the remote control device, and wherein at least one processor, individually and/or collectively, is configured to predict the view point based on the identification information.

5. The image projection device of claim 1, wherein at least one processor, individually and/or collectively, is configured to execute the instructions to:

obtain a coordinate value indicating a position of some or all of the projection points;

model the at least two surfaces based on the obtained coordinate value.

6. The image projection device of claim 1, wherein at least one processor, individually and/or collectively, is configured to execute the instructions to:

receive a sensing signal provided by at least one sensor installed in a real space through the transceiver; and identify a position of the image projection device using the sensing signal.

7. The image projection device of claim 1, wherein a first projection area including a first image display area where a first image in which the pixel values are updated is projected onto the projection surface and displayed in the projection surface is substantially the same in position as a second projection area including a second image display area where a second image before the pixel values are updated is projected onto the projection surface and displayed.

8. The image projection device of claim 1, wherein at least one processor, individually and/or collectively, is configured to execute the instructions to:

determine the image display area by mapping the projection points to a two-dimensional (2D) plane based on the second coordinate value; and set pixel values of an input image as target pixel values to be projected onto projection points included in the image display area in the image to be projected.

9. A method for operating an image projection device, the method comprising:

outputting an image to be projected onto a projection area including an image display area where an image is to be substantially displayed on a projection surface including at least two surfaces bent at a defined angle with respect to a corner;

receiving a control signal for changing a view point at which the projection area is viewed from a remote control device; and updating pixel values of the image to be projected corresponding to projection points of the projection area in response to the control signal, wherein updating pixel values of the image to be projected includes:

converting first coordinate values into second coordinate values with respect to the view point, wherein the first coordinate values indicate a position of the projection point at which the pixel values of the image to be projected onto the least two surfaces are to be projected, wherein the pixel values of the image to be projected are updated so that the image to be displayed in the image display area is viewed in a standardized shape of an initial image at the view point, and wherein the initial image is an image displayed in the image display area prior to the image to be projected.

10. The method of claim 9, further comprising projecting the initial image corrected based on a position of the image projection device onto the image display area in response to an image output request.

11. The method of claim 9, wherein the control signal includes directional identification information indicating a direction in which the view point is to be moved and/or location identification information indicating the view point, and wherein the directional identification information includes an identifier indicating at least one of a front, rear, upper, lower, left, or right direction.

12. The method of claim 9, further comprising predicting the view point based on identification information indicating at least one of a distance or a direction between the image projection device and the remote control device included in the control signal.

13. The method of claim 9, further comprising:

obtaining a coordinate value indicating a position of some or all of the projection points; and modeling the at least two surfaces based on the obtained coordinate value.

14. The method of claim 9, wherein updating pixel values of the image to be projected further comprising:

determining the image display area by mapping the projection points to a two-dimensional (2D) plane based on the second coordinate value; and setting pixel values of an input image as target pixel values to be projected onto projection points included in the image display area in the image to be projected.

15. The method of claim 9, further comprising:

receiving a sensing signal provided by at least one sensor installed in a real space; and identifying a position of the image projection device using the sensing signal.

16. The method of claim 9, wherein a first projection area including a first image display area where a first image in which the pixel values are updated is projected onto the projection surface and displayed in the projection surface is substantially the same in position as a second projection area including a second image display area where a second image before the pixel values are updated is projected onto the projection surface and displayed.

\* \* \* \* \*